US009767057B2

(12) United States Patent
Darbari

(10) Patent No.: US 9,767,057 B2
(45) Date of Patent: Sep. 19, 2017

(54) HARDWARE DATA STRUCTURE FOR TRACKING PARTIALLY ORDERED AND REORDERED TRANSACTIONS

(71) Applicant: Imagination Technologies Limited, Kings Langley (GB)

(72) Inventor: Ashish Darbari, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 176 days.

(21) Appl. No.: 14/832,526

(22) Filed: Aug. 21, 2015

(65) Prior Publication Data

US 2016/0062931 A1    Mar. 3, 2016

(30) Foreign Application Priority Data

Sep. 2, 2014   (GB) .................... 1415520.4

(51) Int. Cl.
| | |
|---|---|
| *G06F 13/364* | (2006.01) |
| *G06F 13/36* | (2006.01) |
| *G06F 11/28* | (2006.01) |
| *G06F 5/00* | (2006.01) |
| *G06F 11/30* | (2006.01) |
| *G06F 9/46* | (2006.01) |
| *G06F 13/42* | (2006.01) |

(52) U.S. Cl.
CPC .............. *G06F 13/364* (2013.01); *G06F 5/00* (2013.01); *G06F 9/467* (2013.01); *G06F 11/28* (2013.01); *G06F 11/30* (2013.01); *G06F 13/36* (2013.01); *G06F 13/4282* (2013.01)

(58) Field of Classification Search
CPC ...... G06F 13/4221; G06F 13/36; G06F 11/28; G06F 11/30; G06F 11/0745; G06F 11/079; G06F 5/00
See application file for complete search history.

(56) References Cited

U.S. PATENT DOCUMENTS

| | | | |
|---|---|---|---|
| 7,555,634 B1 | 6/2009 | Thatipelli et al. | |
| 7,600,078 B1* | 10/2009 | Cen ..................... | G06F 12/0831 711/137 |
| 8,938,636 B1 | 1/2015 | Hochschild et al. | |
| 2004/0008677 A1* | 1/2004 | Cen ..................... | G06F 12/0828 370/389 |
| 2013/0159591 A1 | 6/2013 | Acuna et al. | |

* cited by examiner

*Primary Examiner* — Nimesh G Patel
(74) *Attorney, Agent, or Firm* — Vorys, Sater, Seymour and Pease LLP; Vincent M DeLuca

(57) ABSTRACT

Methods and hardware data structures are provided for tracking ordered transactions in a multi-transactional hardware design comprising one or more slaves configured to receive transaction requests from a plurality of masters. The data structure includes one or more counters for keeping track of the number of in-flight transactions; a table that keeps track of the age of each of the in-flight transactions for each master using the one or more counters; and control logic that verifies that a transaction response for an in-flight transaction for a particular master has been issued by the slave in a predetermined order based on the tracked age for the in-flight transaction in the table.

20 Claims, 16 Drawing Sheets

(A)

(B)

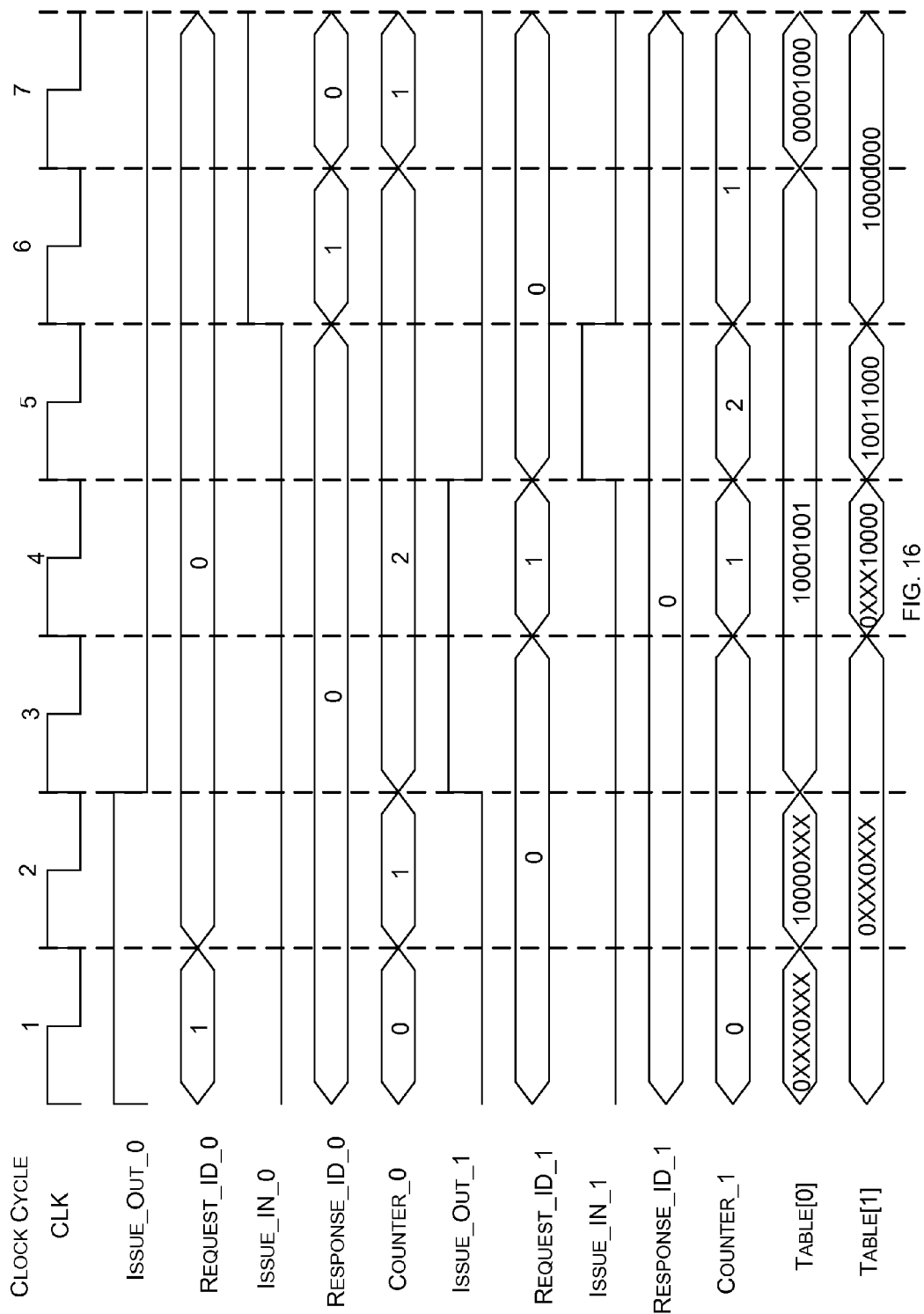

HARDWARE DATA STRUCTURE FOR TRACKING PARTIALLY ORDERED AND REORDERED TRANSACTIONS

BACKGROUND

Many hardware designs, such as bus protocols, coherent fabrics, memory sub-systems, and arithmetic datapaths, can have multiple (sometimes hundreds or thousands of) transactions "in-flight" at any point in time. Such hardware designs are referred to as multi-transactional hardware designs. A transaction is an exchange or interaction of data between start and end points of the design. A transaction is "in-flight" if it has been accepted for processing at an input interface of a component of the design (e.g. a cache) and has not been issued out on an output interface of that component. Accordingly, when a transaction first appears on an input interface of a component it becomes in-flight and it remains in-flight until the transaction is issued out on an output interface of the component.

Often multiple in-flight transactions need to access the same resource, such as a cache, arbiter, memory etc. which can create hazards. A hazard is a condition that occurs when more than one transaction (originating from the same or different requestors) tries to gain access to a shared resource (e.g. memory) at the same time. For example, if there is a write transaction and a read transaction to the same memory address, if the write is issued before the read then the expected behavior is that the write should be completed before the read so that the read will get the new value written by the write. If, however, the read is completed before the write then the read will get the old value instead of the new value resulting in a hazard.

To eliminate hazards the hardware may be designed to implement an ordering on the transactions. This typically involves assigning to the transactions a unique identifier and using a hardware data structure to track the transactions and enforce an order using the unique identifiers. For example, the hardware data structure may ensure that when transaction requests (e.g. read/write requests) are issued on an interface then the corresponding responses (e.g. data payloads) come back in the same order in which the transaction requests were issued.

In some cases ordering does not need to be absolutely enforced (e.g. not all transactions issued to a slave (e.g. memory or cache) have to be completed in the same order in which they were issued). For example, a design with multiple requestors (e.g. multiple masters) issuing transaction requests to a single resource (e.g. slave) can have several hundred or thousand transactions in-flight at any point in time. It may not be necessary for all the transactions issued to the slave to be completed in the order they were issued but only for the transactions issued from each requestor to be completed in order.

This type of ordering is typically implemented by a data structure that comprises a FIFO (First In First Out) for each requestor to keep track of the transactions for that requestor. The data structure also comprises a register set/clear mechanism that is used to enable transaction responses to come back out of order with respect to transaction requests from other masters. Each FIFO may use a two-dimensional array and multiple pointers (e.g. a read pointer and a write pointer) to keep track of elements in the array. However, formal verification using a FIFO for tracking ordered transactions can make the formal verification difficult.

The embodiments described below are provided by way of example only and are not limiting of implementations which solve any or all of the disadvantages of known data structures for tracking ordered transactions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments described herein relate to methods and hardware data structures for tracking ordered transactions in a multi-transactional hardware design comprising one or more slaves configured to receive transaction requests from a plurality of masters. In some examples, the data structure comprises one or more counters for keeping track of the number of in-flight transactions; a table that keeps track of the age of each of the in-flight transactions for each master using the one or more counters; and control logic that verifies that a transaction response for an in-flight transaction for a particular master has been issued by the slave in a predetermined order (e.g. corresponds to the oldest in-flight transaction for that master) based on the tracked age for the in-flight transaction in the table.

A first aspect provides a hardware data structure configured to track a plurality of ordered transactions in a multi-transactional hardware design comprising a slave and a plurality of masters, the slave configured to receive transaction requests from more than one of the plurality of masters, the hardware data structure comprising: one or more counters configured to track a number of in-flight transactions in the hardware design; a table configured to track an age of each of the in-flight transactions for the plurality of masters using the one or more counters; and control logic configured to verify that a transaction response issued by the slave for an in-flight transaction for a particular master has been issued in a predetermined order based on the tracked age of the in-flight transaction in the table.

A second aspect provides a method of tracking a plurality of transactions in a multi-transactional hardware design comprising a slave and a plurality of masters, the slave configured to receive transaction requests from more than one of the plurality of masters, the method comprising: tracking a number of in-flight transactions in the hardware design using one or more counters; tracking an age of each of the in-flight transactions for the plurality of masters in a table using the one or more counters; and verifying that a transaction response issued by the slave for an in-flight transaction for a particular master has been issued in a predetermined order based on the tracked age of the in-flight transaction in the table.

A third aspect provides a computer readable storage medium having encoded thereon computer readable program code for generating the hardware data structure of the first aspect.

A fourth aspect provides a computer readable storage medium having encoded thereon computer readable program code for generating a hardware data structure configured to perform the method of the second aspect.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 16 is a timing diagram illustrating an example of the signals and data elements of the data structure of FIG. 7 over a period of time.

Figure 1:
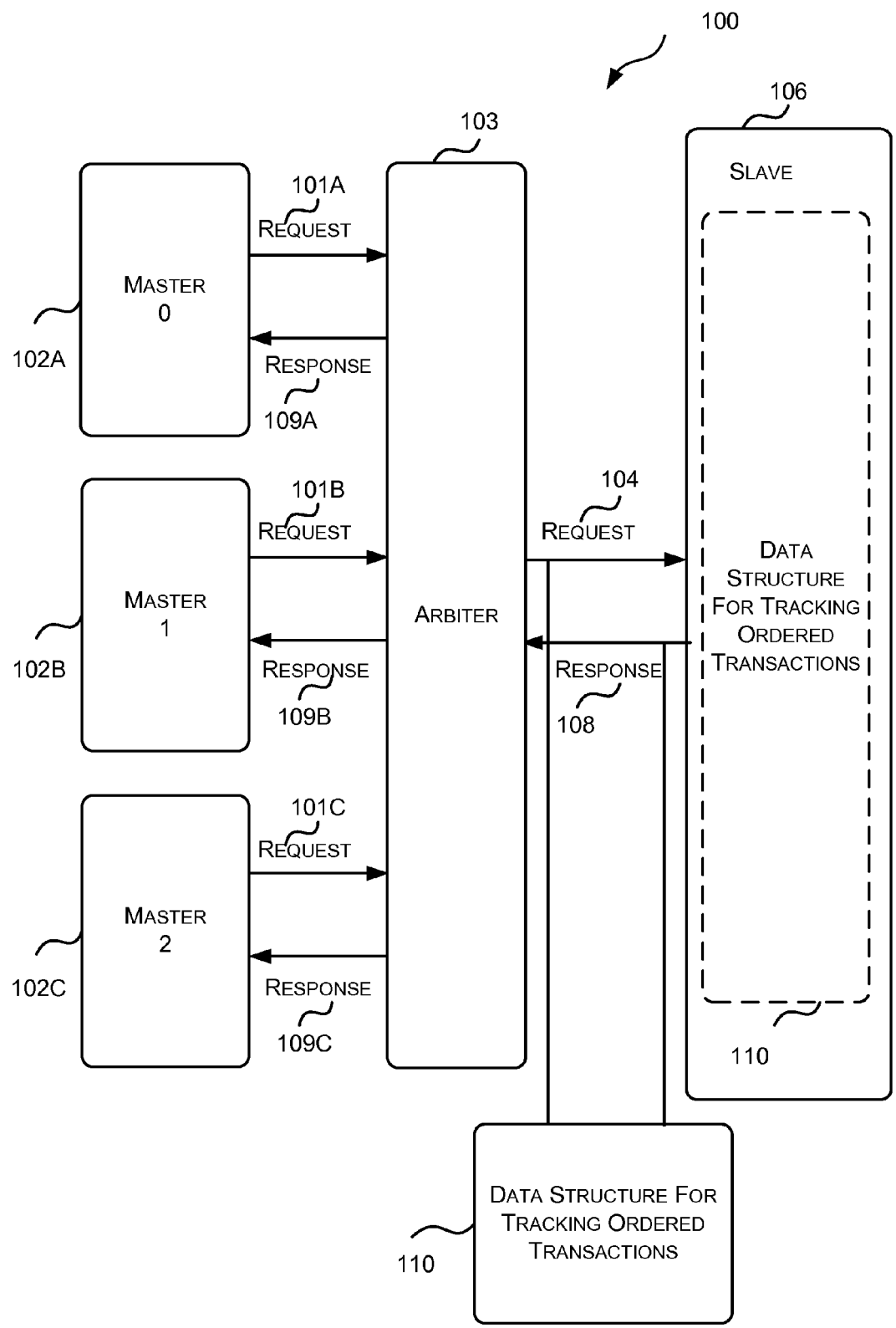
FIG. 1 is a block diagram of an example multi-transactional hardware design with a slave and multiple masters.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Embodiments described herein relate to methods and hardware data structures for tracking ordered transactions in a multi-transactional hardware design with one or more slaves which receive transaction requests from multiple masters. In some examples, the data structure comprises a counter for each master that keeps track of the number of in-flight transactions for that master; a table that keeps track of the age of all in-flight transactions using the counters; and control logic that verifies that a transaction response has been issued by the slave in the correct order based on the age information in the table. In one example, the control logic verifies that the transaction response has been issued by the slave in the correct order if the table indicates that the transaction is the oldest in-flight transaction for the master.

The term "hardware design" is used herein to refer to an analog or digital implementation of a specification (e.g. user specified functionality) for an electronic device (e.g. a processor) that is ultimately synthesized into silicon. The term "hardware data structure" is used herein to refer to a structure that interacts with a hardware design to store, organize, and track data related to the hardware design. The hardware data structure may be used as a design component or a verification component. Where the hardware data structure is used as a design component the hardware data structure implements certain desired functionality which is ultimately synthesized into silicon. Where the hardware data structure is used as a verification component it allows an aspect of the hardware design to be verified through formal or simulation-based verification.

As described above, many hardware designs, such as bus protocols, coherent fabrics, memory sub-systems, and arithmetic datapaths, are multi-transactional meaning they can have multiple (sometimes hundreds or thousands of) transactions in-flight at any point in time. A transaction is an exchange or interaction of data between start and end points of the design. Typically a transaction originates from a master (e.g. the requestor) and is sent to a slave for processing. For example, a master may send a request to read from, or write to, a memory or a cache (e.g. slave). A transaction is "in-flight" if it has been accepted for processing at an input interface of the slave and has not been issued out on an output interface of the slave. Accordingly, when a transaction first appears on an input interface of the slave it becomes "in-flight" and it remains "in-flight" until the transaction is issued out on an output interface of the slave.

Often multiple in-flight transactions need to access the same resource, such as a cache, arbiter, memory etc. which can create hazards. A hazard is a condition that occurs when more than one transaction (originating from the same or different requestors) tries to gain access to a shared resource (e.g. memory) at the same time. For example, if there is a write transaction and a read transaction to the same memory address, if the write is issued before the read then the expected behavior is that the write should be completed before the read so that the read will get the new value written by the write. If, however, the read is completed before the write then the read will get the old value instead of the new value resulting in a hazard.

To eliminate hazards the hardware may be designed to implement an ordering of the transactions. This typically involves assigning the transactions a unique identifier and using a hardware data structure to track the transactions and enforce an order using the unique identifiers. For example, the hardware data structure may ensure that when transaction requests (e.g. read/write requests) are issued on an interface that the corresponding responses (e.g. data payloads) are issued in the same order in which the transaction requests were issued.

In some cases ordering does not need to be absolutely enforced (e.g. not all transactions issued to a slave (e.g. memory or cache) have to be completed in the same order in which the requests were issued). For example, a design with multiple requestors (e.g. masters) issuing transaction requests to a single resource (e.g. slave) can have several hundred or thousand transactions in-flight at any point in time. It may not be necessary for all the transactions issued to the slave to be completed in the order the requests were issued but only for the transactions issued from each requestor to be completed in order. For example, if a first master issues a transaction request with transaction ID 1 to a slave, a second master issues a transaction request with transaction ID 2 to the slave, and then the first master issues a transaction request with transaction ID 3 to the slave, the transaction request from the second master with transaction ID 2 may be completed before the transaction request from the first master with transaction ID 1 even though the transaction request with transaction ID 2 was issued later since they are from different masters. However, the transaction request with transaction ID 1 should be completed before the transaction request with transaction ID 3 since they are from the same master.

Reference is now made to FIG. 1 which shows an example multi-transactional system 100 comprising a plurality of masters 102A, 102B and 102C that are each configured to send transaction requests 101A, 101B, 101C to a slave 106. Since the slave 106 of FIG. 1 only has one input interface the transaction requests 101A, 101B and 101C are sent to an arbiter 103 which selects one of the received transaction requests 101A, 101B and 101C and transmits the selected transmission request 104 to the slave. The slave 106 processes each transaction request 104 and issues a transaction response 108 to the arbiter 103. The arbiter 103 directs the transaction response 108 issued by the slave 106 to the appropriate master 102A, 102B or 102C as a master-specific transaction response 109A, 109B or 109C.

If it is desirable that the transaction responses 108 are issued to each master 102A, 102B and 102C in the same order in which the corresponding transaction requests were issued by the master 102A, 102B or 102C, then the each master 102A, 102B and 102C may be configured to assign a unique identifier (e.g. a transaction ID) to each transaction. The transaction ID of the transaction request will be referred to herein as the Request_ID and the transaction ID of a transaction response will be referred to herein as the Response_ID.

Each master 102A, 102B, and 102C is typically configured to have a maximum number of transactions in-flight at any time (referred to herein as MAX_TRANSACTIONS). To ensure that each in-flight transaction can be assigned a unique identifier each master 102A, 102B or 102C typically has at least MAX_TRANSACTIONS unique identifiers. For example, if a master 102A, 102B or 102C can have ten transactions in-flight at any time, then the master will have at least ten unique identifiers (e.g. transaction IDs) that can be assigned to the transactions.

In some cases each master may use the same set or range of identifiers. In other cases one or more of the masters 102A, 102B or 102C may use a different set or range of identifiers from one or more of the other masters 102A, 102B or 102C. For example, one master may use transaction IDs 0 to 7 whereas another master may use transaction IDs 0 to 31.

A data structure 110 may be implemented to monitor the transaction requests 104 and responses 108 using the transactions IDs to ensure the responses are issued to each master 102A, 102B and 102C in the correct order. In some cases the data structure 110 is configured to ensure global ordering (e.g. ordering of all transactions from all masters 102A, 102B and 102C). In other cases the data structure 110 is configured to ensure local ordering (e.g. ordering of transactions for each master 102A, 102B or 102C only). The data structure 110 may be used, as shown in FIG. 1, to verify that the transaction responses are being issued to their masters 102A, 102B and 102C in the correct global or local order. Alternatively, or in addition, the data structure 110 may be implemented in the slave 106 to track the transaction requests and responses to ensure that the transaction responses being issued back to the masters 102A, 102B and 102C are in the correct global or local order.

Each transaction request 104 and response 108 typically involves the arbiter 103 (acting as master) and the slave 106 exchanging a plurality of messages and/or signals. The data structure 110 monitors these messages and/or signals to determine whether a transaction request/response has been issued and whether any transaction response has been issued in the correct order.

Figure 2:
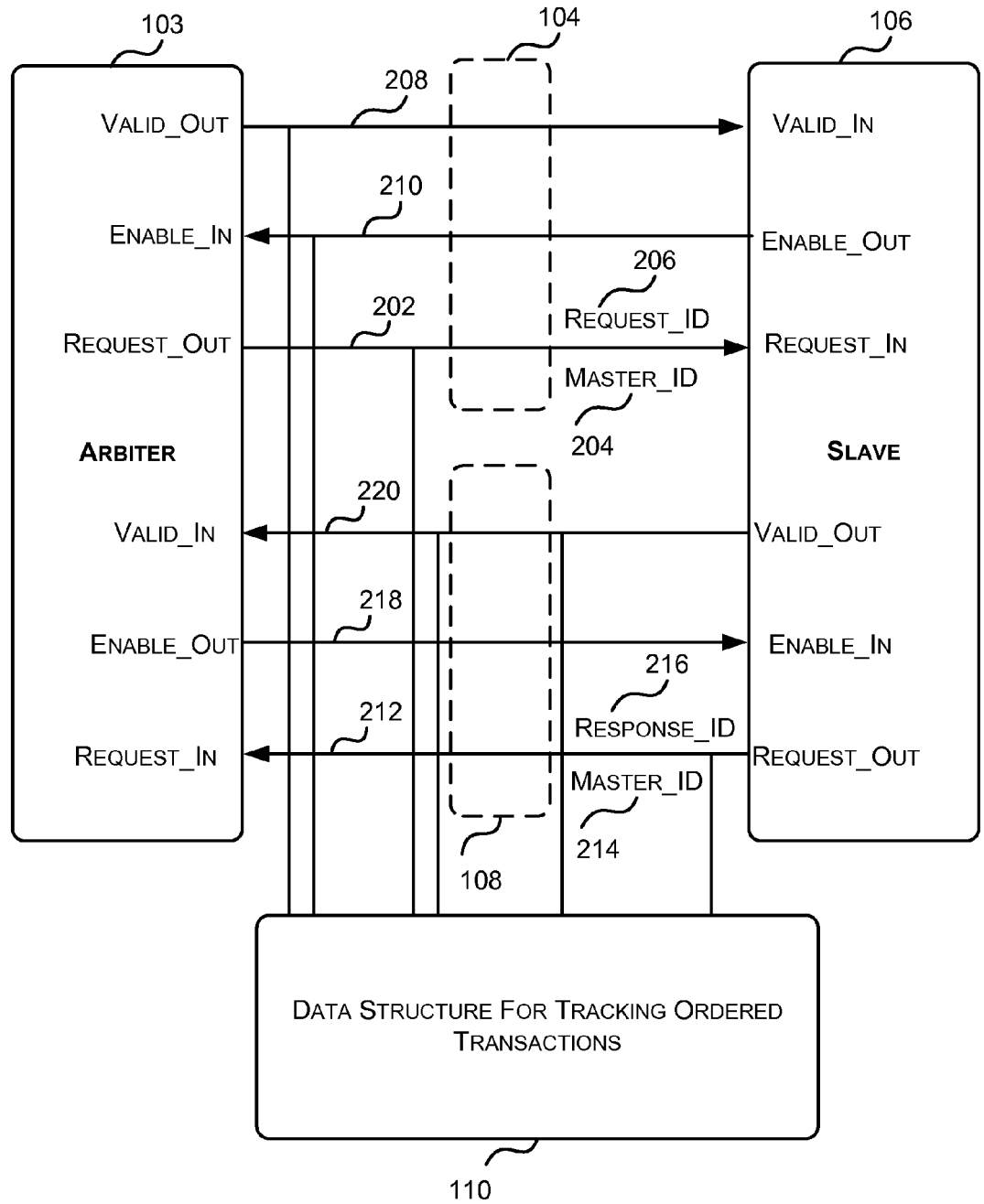
FIG. 2 is a block diagram illustrating the information exchanged with the slave of FIG. 1 for transaction requests and responses.

Reference is now made to FIG. 2 which illustrates example messages sent between the arbiter 103 (acting as master) and the slave 106 of FIG. 1 for transaction requests 104 and transaction responses 108 which may be monitored by the data structure 110.

In the example shown in FIG. 2 the arbiter 103 sends a transaction request message 202 (comprising information identifying the master (e.g. Master_ID 204) that issued the request and the transaction ID (e.g. Request_ID 206)) via an output interface after the arbiter 103 has indicated that it is ready to send the request by sending a Valid_Out signal 208 which is interpreted by the slave as a Valid_In signal; and after the arbiter 103 has received an Enable_In signal 210 from the slave 106 indicating it is ready to receive the request.

Similarly the arbiter 103 receives a transaction response 212 message (comprising information identifying the master (e.g. Master_ID 214) and the transaction ID (e.g. Response_ID 216)) via an input interface after the arbiter 103 has sent an Enable_Out signal 218 to the slave 106 indicating it is ready to receive the response 212; and after the arbiter 103 has received a Valid_In signal 220 from the slave 106 indicating the slave 106 is ready to send the response.

It will be evident to a person of skill in the art that the multi-transaction system 100 of FIG. 1 (and further described in FIG. 2) is exemplary only and that the techniques and principles described herein may equally be applied to other multi-transactional systems that have one or more slaves that receive transaction requests from multiple requestors (e.g. multiple masters). In other examples, the slave may have multiple input and output ports and each master or requestor may be directly (e.g. without going through an arbiter) connected to an input port and an output port of the slave to issue transaction requests and receive transaction responses respectively. In these examples, the data structure for tracking ordered transactions 110 may be configured to monitor each input and output port of the slave that is connected to a master. In yet other examples, there may be multiple slaves and the transactions related to each slave may be tracked globally or locally.

Figure 3:
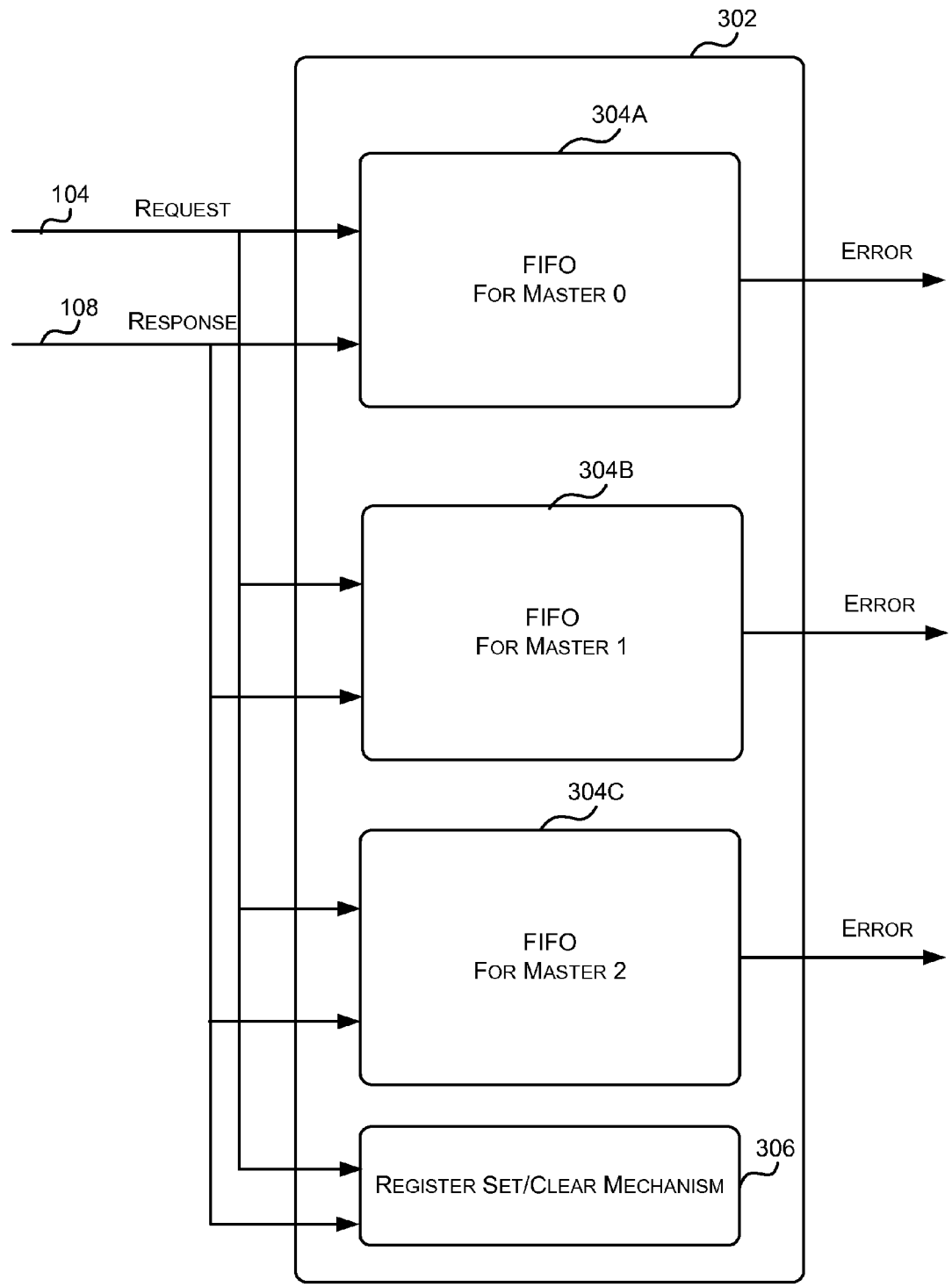
FIG. 3 is a block diagram of a known data structure for tracking partially ordered and reordered transactions.

The most commonly used hardware data structure for tracking partially ordered and reordered transactions in a multi-requestor system is a FIFO-based data structure that comprises a plurality of FIFOs and a register set/clear mechanism. An example of such a data structure 302 for tracking local order (as opposed to global order) in the multi-transactional system 100 of FIG. 1 is illustrated in FIG. 3. In particular, the data structure 302 of FIG. 3 comprises a FIFO 304A, 304B, and 304C for each master or requestor. Accordingly, where there are three masters/requestors (as shown in FIG. 1) then the data structure 302 comprises three FIFOs 304A, 304B and 304C. Each FIFO 304A, 304B, 304C keeps track of the in-flight transactions for a particular master. An example FIFO is described with reference to FIGS. 4-6.

The data structure 302 also typically comprises a register set/clear mechanism 306 to track out-of order traffic. In particular, if transaction responses are issued out of order between requestors a register with mask bits can be used to set (on a transaction request) and clear (on a transaction response) the bits. Any bit set in the mask corresponding to a transaction currently in-flight should eventually be cleared indicating that a response is issued from the slave for each request even though the absolute order is not important.

A similar FIFO-based data structure may also be used for tracking global order (e.g. the order of all transactions from all masters 102A, 102B and 102C). However, such a data structure would comprise only one FIFO since it does not need to track the transactions related to each master separately.

Figure 4:
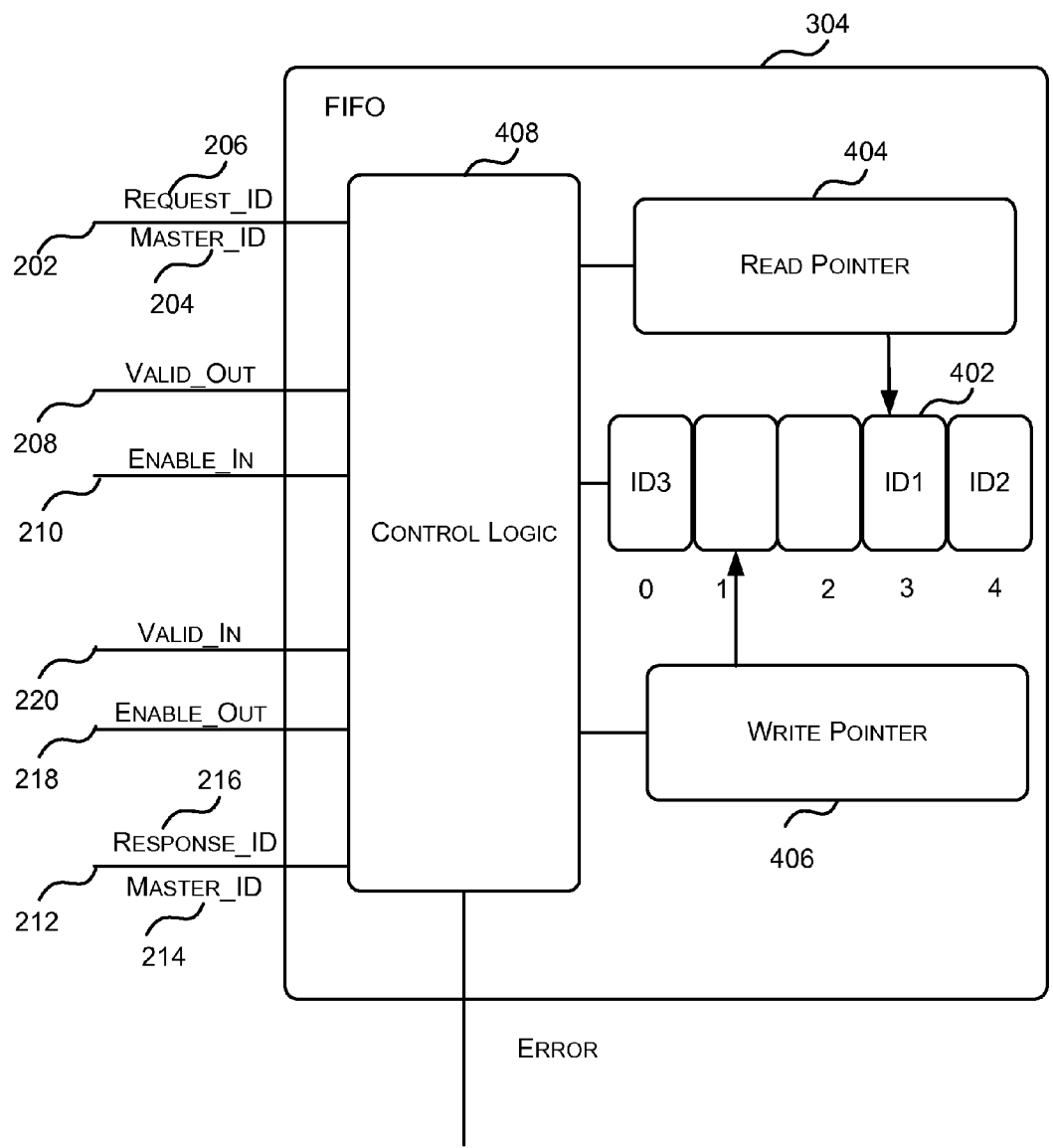
FIG. 4 is a block diagram of an example FIFO of FIG. 3.

Reference is now made to FIG. 4 which illustrates an example FIFO 304 of the data structure 302 of FIG. 3 (e.g. which may be used for any or all of FIFOs 304A, 304B and 304C) for tracking ordered transactions for a particular requestor. The FIFO 304 comprises an indexed array 402 for keeping track of the transaction IDs of the in-flight transactions; a read pointer 404 which points to the index containing the transaction ID corresponding to the oldest in-flight transaction (i.e. the in-flight transaction that was issued the earliest) for a master/requestor; a write pointer 406 which points to the next free or empty index of the array 402; and control logic 408 for controlling the array 402, read pointer 404 and write pointer 406.

When the control logic 408 detects that a transaction request has been made by a master 102A, 102B or 102C (e.g. when the Valid_Out 208 and Enable_In 210 signals are high) the control logic 408 writes the transaction ID of the transaction request (e.g. Request_ID 206) at the index pointed to by the write pointer 406. The control logic 408 then increments the write pointer 406 to point to the next index of the array 402.

Figure 5:
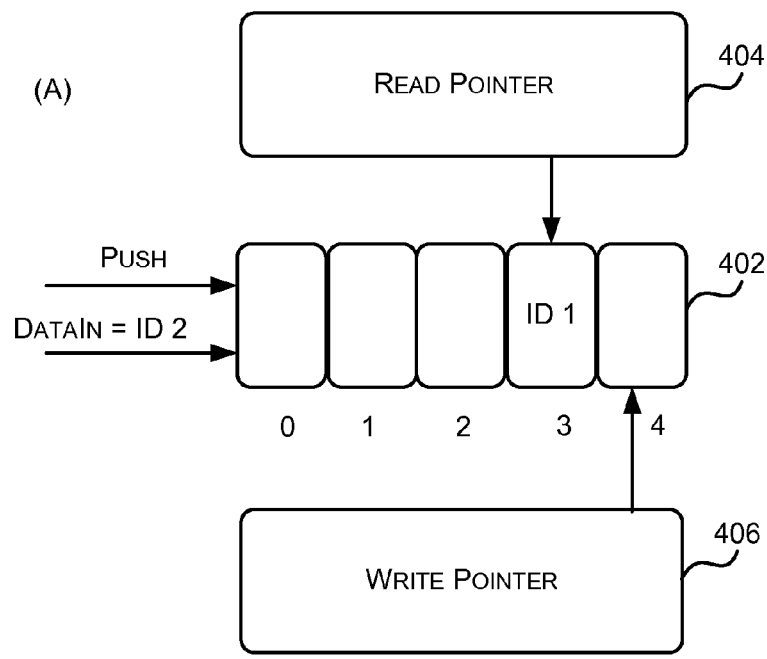
FIG. 5 is a set of bock diagrams of the FIFO of FIG. 4 illustrating adding a transaction ID to the FIFO after a transaction request has been issued.
Figure 5:
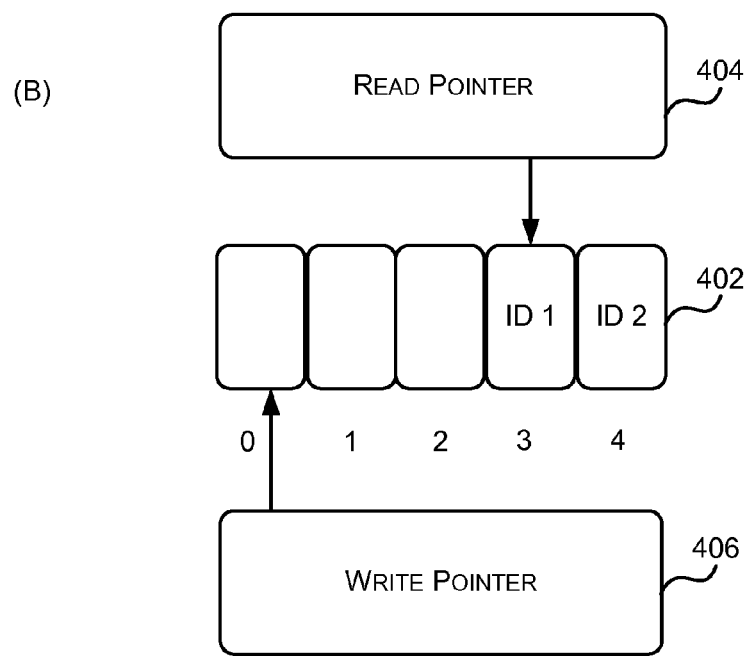

This is illustrated in FIG. 5. In particular in (A) of FIG. 5 an array 402 comprises one transaction ID (e.g. ID 1) at index three of the array 402 so the read pointer 404 points to index three and the write pointer 406 points to the next index (e.g. index four) of the array. When the control logic 408 detects that a transaction request has been made by a particular master 102A, 102B or 102C the control logic 408 sends the Request_ID 206 (e.g. ID 2) to the array 402 with a push command (e.g. the push signal is set high). As shown in (B) of FIG. 5 this causes the Request_ID 206 (e.g. ID 2) to be written at the index pointed to by the write pointer 406 (e.g. index four); and the write pointer 406 to be incremented to point the next index (e.g. index zero) of the array 402.

When the control logic 408 detects a transaction response has been received by a particular master 102A, 102B or 102C (e.g. when the Valid_In 220 and Enable_Out 218 signals (from the perspective of the master) are high) the control logic 408 obtains the oldest transaction ID in the array (e.g. the transaction ID at the index pointed to by the read pointer 404) and increments the read pointer 404 to point to the next index of the array (e.g. the index containing the transaction ID corresponding to the next oldest transaction). The control logic 408 then compares the oldest transaction ID in the array with the transaction ID of the response (e.g. Response_ID 216) to determine if the response has come back in the correct order. Specifically, if the response does not correspond to the oldest in-flight transaction for the requestor then the response received from the slave has been sent before the response of the oldest in-flight transaction and there is an error.

Figure 6:
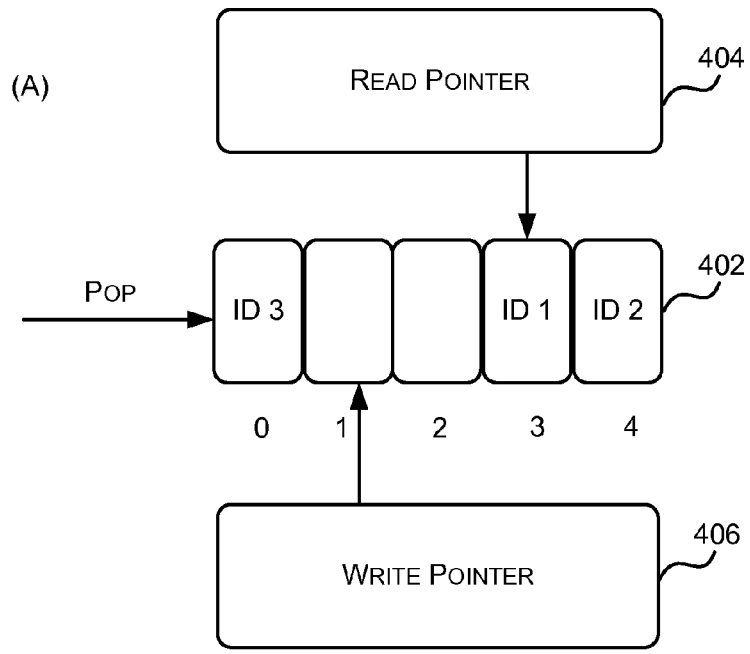
FIG. 6 is a set of bock diagrams of the FIFO of FIG. 4 illustrating removing a transaction ID from the FIFO after a transaction response has been issued.
Figure 6:
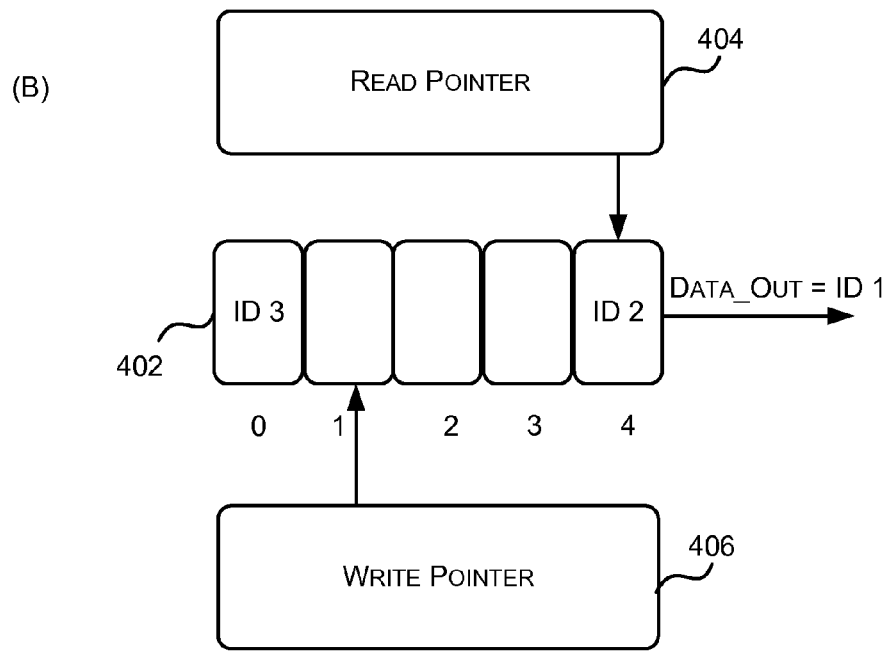

This is illustrated in FIG. 6. In particular in (A) of FIG. 6 an array 402 comprises three transactions IDs (e.g. ID 1, ID 2 and ID 3) at indexes three, four and zero respectively. The read pointer 404 points to index three indicating ID 1 is the ID corresponding to the oldest in-flight transaction. When the control logic 408 detects that a response has been received for a particular master 102A, 102B or 102C the control logic 408 sends a pop command (e.g. the pop signal is set high) to the array 402. As shown in (B) of FIG. 6 this causes the array to output the ID at the index pointed to by the read pointer 404 (e.g. ID 1 at index three) and to increment the read pointer 404 to point to the next index of the array (e.g. index four) which is the ID for the next oldest in-flight transaction. The control logic 408 then compares the output data (e.g. ID 1) to the Response_ID 216 to see if they match.

The number of state-bits (or flip-flops) required to implement the FIFO 304 is equal to the sum of the number of bits required for the array 402, the number of bits required for the read pointer 404, and the number of bits required for the write pointer 406. The array 402 is defined by the number of IDs that it can store (e.g. the number of elements it has)

which should be equal or greater than the maximum number of transactions that can be in-flight at any one time (e.g. MAX_TRANSACTIONS), and the number of bits required to store each ID (e.g. ID_WIDTH). Therefore the total number of bits required for the array 402 is MAX_TRANSACTIONS*ID_WIDTH. The read and write pointers 404 and 406 are used to hold an index to the array 402 so if the array has MAX_TRANSACTIONS elements, the pointers require $\log_2$(MAX_TRANSACTIONS) bits. Accordingly, the total number of bits to implement the FIFO can be represented by formula (1):

$$(\text{MAX\_TRANSACTIONS} * \text{ID\_WIDTH}) + (2 * \log_2(\text{MAX\_TRANSACTIONS})) \quad (1)$$

Accordingly, where MAX_TRANSACTIONS is 1024 and the ID_WIDTH is 10, the number of state-bits (or flip-flops) required to implement the FIFO 402 is 10260.

Thus if there are 10 requestors the FIFO-based hardware data structure 302 has 10 FIFOs and this requires 102600 state-bits (or flip-flops) to implement.

While this produces a relatively efficient data structure for tracking ordered transactions in terms of the area footprint required, such a structure can make verification difficult, particularly formal verification.

In particular, hardware designs are typically verified (e.g. determined to meet their specification) before they are implemented in silicon because discovering an error post-silicon can be very expensive to fix. A design may be verified through simulation based verification or formal verification. Simulation based verification requires the generation of input stimuli which is time consuming, not easily adaptable and does not provide an exhaustive answer as to whether the design meets the specification (i.e. it is limited by the input stimuli). In contrast, formal verification involves defining the properties to be verified mathematically and analyzing the state space of the design implementation to determine if the properties are satisfied. This allows verification to be done without generating input stimuli. It also allows the design behavior to be proved or disproved for all possible states.

Accordingly, formal verification provides certain advantages over simulation-based verification, however, the sequential nature of pointer increments means that the array elements of a FIFO can only be accessed sequentially. This makes state-space search extremely difficult because it consumes more time and memory to perform an exhaustive search. This is because the structure of the FIFO 304 means that only one location (the one pointed to by the read pointer or write pointer respectively) can be read from or written to causing formal verification to progress much more slowly. This prevents formal verification tools from giving a determined answer giving an impression that the formal verification is not scaling. This makes formal verification of a FIFO 304 data structure used to track ordered transactions (and the ordering enforced thereby) an intractable task.

To address this problem, described herein is a new data structure for tracking partially ordered and reordered transactions in a multi-transactional design with multiple requestors that comprises a plurality of counters and an indexed table. In particular, the use of an indexed table allows access to any entry in the table at any time, as opposed to the two-dimensional array of a FIFO 304 which only allows access to the elements pointed to by the pointers. Accordingly the data structure described herein eliminates the formal verification issues related to the sequential nature of pointers.

Figure 7:
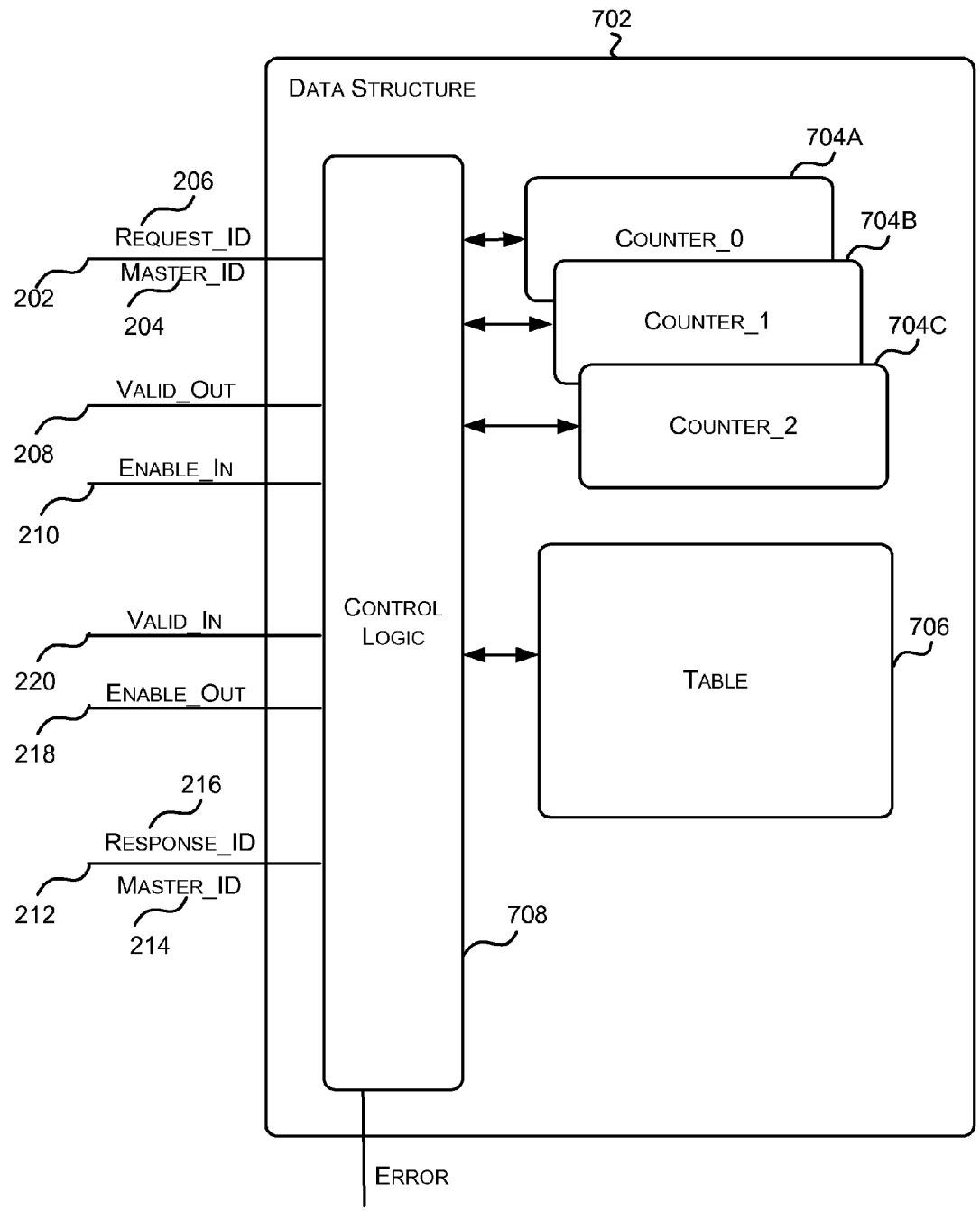
FIG. 7 is a block diagram of an example new data structure for tracking partially ordered and reordered transactions using a plurality of counters and a table.

Reference is now made to FIG. 7 which illustrates an example of the new data structure 702 which may be used as the data structure 110 in FIG. 1 to track local ordering for the multi-transactional system of FIG. 1 (e.g. for a multi-transactional system with a slave that receives transaction requests from multiple requestors/masters). The new data structure 702 comprises a plurality of counters 704A, 704B and 704C for keeping track of the number of in-flight transactions for each requestor or master; an indexed table 706 for keeping track of the relative age of each in-flight transaction with respect to the other transactions issued by the same master or requestor; and control logic 708 for controlling the counters 704A, 704B and 704C and the table 706.

Each counter 704A, 704B, 704C keeps a running count of the number of transactions that are in-flight (e.g. transaction requests that have been issued, but no response has been issued) for a particular master or requestor. For example, Counter_0 704A may keep track of the number of in-flight transactions for Master 0, Counter_1 704B may keep track of the number of in-flight transactions for Master 1, and Counter_2 704C may keep track of the number of in-flight transaction for Master 2. In some cases, the corresponding counter 704A, 704B, 704C is incremented each time a transaction request is issued by a particular master or requestor and is decremented each time a transaction response is issued from the slave back to that master or requestor.

In some cases each counter 704A, 704B, 704C has the ability to count up to the maximum number of transactions (MAX_TRANSACTIONS) that can be in-flight at any one time for the corresponding requestor. For example, if a maximum of ten transactions can be in-flight at any one time then the counter should be able to count to at least ten. Accordingly, in these cases the counter requires at least $\log_2$(MAX_TRANSACTIONS)+1 bits. The masters 102A, 102B and 102C may have the same MAX_TRANSACTIONS or different MAX_TRANSACTIONS. Accordingly, each counter 704A, 704B or 704C may have a different number of bits.

The table 706 keeps track of the order in which the in-flight transaction requests were issued (e.g. the age of the in-flight transactions) from each master or requestor. In some cases the table 706 comprises a row or entry for each master or requestor. Each row comprises transaction information indicating which transactions for the corresponding requestor are in-flight and their relative age. The transaction information may comprise in-flight information for each possible transaction ID where the in-flight information comprises information indicating whether a transaction with that ID is currently in-flight and if so, the age of that in-flight transaction with respect to the other in-flight transactions for that master. In some cases the relative age of a particular in-flight transaction is determined from the corresponding counter value (the counter value corresponding to the master/requestor). Example implementations for the table 706 will be described with reference to FIG. 8.

The control logic 708 is configured to: (1) detect when transaction requests are issued and responses received and update the counters 704A, 704B and 704C and table 706 accordingly; and (2) detect when responses are received out of order and issue an error based on the information in the table 706.

Figure 8:
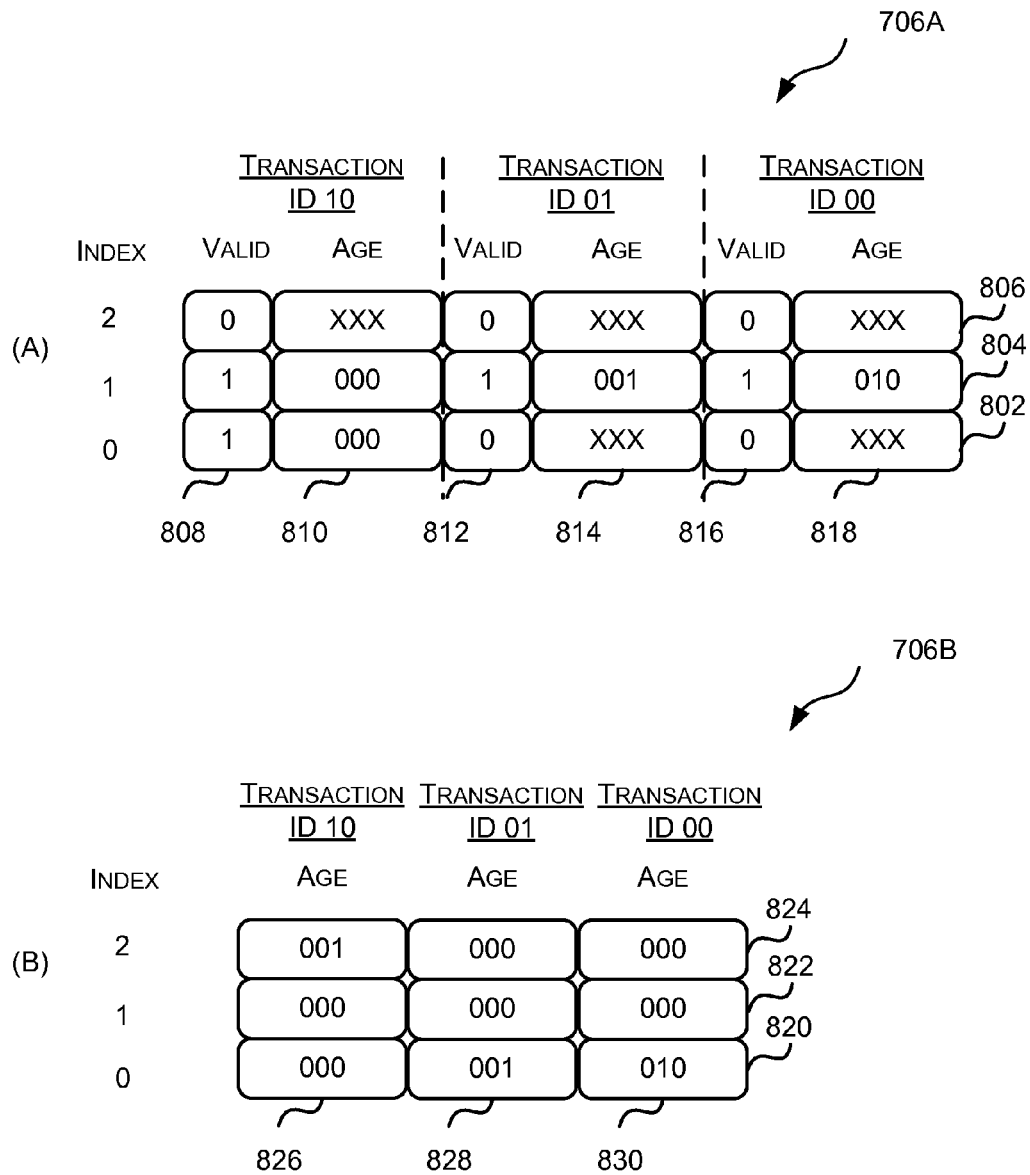
FIG. 8 is a set of block diagrams illustrating example tables for the data structure of FIG. 7.

Reference is now made to FIG. 8 which illustrates two example implementations for the table 706 of FIG. 7. In particular, (A) of FIG. 8 illustrates a first implementation 706A of the table 706 and (B) of FIG. 8 illustrates a second implementation 706B of the table 706.

The first implementation 706A of the table 706 comprises a plurality of rows 802, 804 and 806 and columns 808, 810, 812, 814, 816 and 818. Each row corresponds to particular master/requestor and is indexed by the master's ID. For example, in (A) of FIG. 8 the first row 802 corresponds to the first master/requestor (e.g. Master ID "00" (0)), the second row 804 corresponds to the second master/requestor (e.g. Master ID "01" (1)), and the third row 806 corresponds to the third master/requester (e.g. Master ID "10" (2)). Note that a binary representation of a number is shown herein in quotes (e.g. "10") and the corresponding decimal representation of the number is shown herein in brackets after the binary representation.

The columns 808, 810, 812, 814, 816 and 818 provide information on the in-flight transactions for the corresponding master and are referred to as the in-flight information. Each column is associated with a particular transaction ID and provides information on the status of transactions with that ID. In the example shown in (A) of FIG. 8 there is a valid column 808, 812, 816 and an age column 810, 814, 818 for each possible transaction ID. As described above, each Master may use a different set of transaction IDs (e.g. one Master may use transaction IDs 0 to 7 whereas another master may use transaction IDs 0 to 31) thus the number of columns in each row may be different. For example, a master using transaction IDs 0 to 7 may have 16 columns—a valid column and an age column for each of the eight possible transaction IDs—and a master using transaction IDs 0 to 31 may have 64 columns—a valid column and an age column for each of the thirty-two possible transaction IDs.

Each valid column 808, 812 and 816 indicates whether a transaction with the corresponding transaction ID is currently in-flight. In some cases the valid column comprises a single bit (referred to herein as the valid bit) that is set (e.g. set to a value of 1) when a transaction with that transaction ID is currently in-flight and is cleared (e.g. set to a value of 0) when a transaction with that transaction ID is not currently in-flight. For example, in (A) of FIG. 8, row 0 has one valid bit set (for transaction ID "00") thus Master 0 currently has one transaction in-flight (transaction ID "00"); row 1 has three valid bits set (for transaction IDs "00", "01" and "10"), thus Master 1 currently has three transactions in-flight; and row 2 has no valid bits set thus Master 2 currently has no transactions in-flight.

Each age column 810, 814 and 818 indicates the order of the in-flight transaction with the corresponding transaction ID with respect to the other in-flight transactions for the corresponding master/request (e.g. the age of the in-flight transaction). In some cases the age column comprises a numerical value (referred to herein as the age value) that indicates the order in which the in-flight transaction was issued. In some cases the higher the age value the newer the in-flight transaction (e.g. the more recently the transaction request was issued) and the lower the age value the older the in-flight transaction (e.g. the more time has passed since the transaction request was issued). For example, in (A) of FIG. 8, master 1 has three transactions in-flight (e.g. three transaction IDs with non-zero valid bits), namely transaction IDs "10", "01" and "00", with age values "000", "001" and "010" respectively. Accordingly, transaction ID "10" is the oldest (e.g. it has the smallest age value), transaction ID "01" is the second oldest (e.g. it has the second smallest age value), and transaction ID "00" is the youngest (e.g. it has the largest age value).

The second implementation 706B of the table 706 (as shown in (B) of FIG. 8) also comprises a plurality of rows 820, 822 and 824 and columns 826, 828 and 830. Like, the first implementation 706A, each row 820, 822 and 824 comprises information for a particular master/requestor. In the example shown in (B) of FIG. 8, the first row 820 comprises information for Master 0, the second row 822 comprises information for Master 1 and the third row 824 comprises information for Master 2.

The columns 826, 828 and 830 provide information on the in-flight transactions for the corresponding master. Each column 826, 828 and 830 is associated with a particular transaction ID and provides information on the status of transactions with that ID. In the example shown in (B) of FIG. 8, there is an age column 826, 828 and 830 for each possible transaction ID.

Each age column 826, 828 and 830 indicates both (i) whether a transaction with the corresponding transaction ID is currently in-flight; and (ii) if in-flight, the order of the transaction with respect to the other in-flight transactions for the same master (e.g. the age of the in-flight transaction). In some examples, the age column comprises a numerical value referred to as the age value. In some cases an age value of zero indicates that a transaction with the corresponding ID is not in-flight and an age value greater than zero indicates the transaction is currently in-flight. In these cases, if the age value is greater than zero then the age value indicates the age of the in-flight transaction with respect to the other in-flight transactions for the same master. In some cases, the higher the age value the newer the in-flight transaction (e.g. the more recently the transaction request was issued) and the lower the age value the older the in-flight transaction (e.g. the more time has passed since the transaction request was issued).

For example, in (B) of FIG. 8, Master 0 has two transactions in-flight (e.g. two transaction IDs with non-zero age values), namely transaction IDs "01" and "00", with age values of "001" and "010" respectively. Accordingly transaction ID "01" is the oldest in-flight transaction (e.g. it has the lowest non-zero age value) and transaction ID "00" is the youngest in-flight transaction (e.g. it has the highest non-zero age value).

Since the table has a row for each master the number of rows in the table is equal or greater than NUM_MASTERS where NUM_MASTERS is the number of masters. Where the table has a valid column and an age column each row will have $1+\log_2(\text{MAX\_TRANSACTIONS})+1$ bits per transaction ID. If there are MAX_TRANSACTIONS then the total number of bits for each row is $\text{MAX\_TRANSAC-TIONS}*(1+\log_2(\text{MAX\_TRANSACTIONS})+1)$. Accordingly, the total number of bits for the table is as shown in equation (2)

$$\text{NUM\_MASTERS}*\text{MAX\_TRANSACTIONS}*(1+\log_2(\text{MAX\_TRANSACTIONS})+1) \qquad (2)$$

Accordingly, where MAX_TRANSACTIONS is 1024 and NUM_MASTERS is 10, the minimum number of bits (or flip-flops) to implement the data structure 702 is 122880. While this is an increase over the number of bits to implement the FIFO-based data structure 302 of FIG. 3, it is a much more efficient data structure for verification, particularly for formal verification.

As noted above each master may have a different number of MAX_TRANSACTIONS thus the counters 704A, 704B and 704C may have a different number of bits. As a result the age columns in different rows may have a different number of bits based on the size of the corresponding counter 704A, 704B or 704C.

In either implementation 706A or 706B, the rows and columns of the table 706 are updated by the control logic 708.

Figure 9:
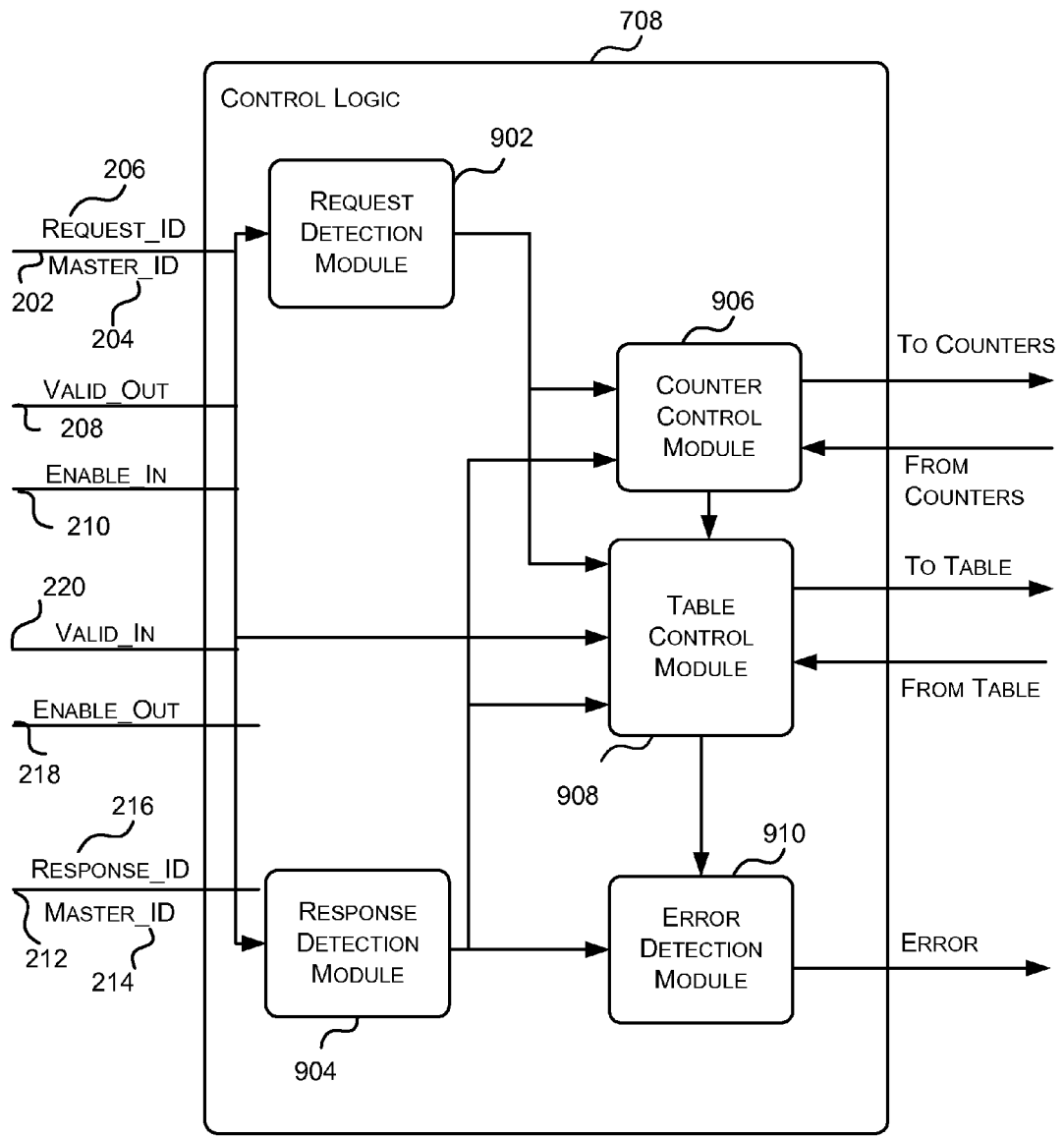
FIG. 9 is a block diagram of an example control logic of the data structure of FIG. 7.

Reference is now made to FIG. 9 which illustrates an example of the control logic 708 of FIG. 7. In the example of FIG. 9, the control logic 708 comprises a request detection module 902, a response detection module 904, a counter control module 906, a table control module 908 and an error detection module 910.

The request detection module 902 is configured to detect when a transaction request has been issued from a master 102A, 102B or 102C (e.g. when there is a new in-flight transaction). In some cases, the request detection module 902 is configured to detect that a transaction request has been issued from a master 102A, 102B or 102C when the Valid_Out 208 and Enable_In 210 signals are high. It will be evident to a person of skill in the art that this is an example only and that in other cases other control signals may be used to detect when a transaction request has been issued. When the request detection module 702 detects a transaction request has been issued it sends an indication of the detection along with information identifying the master that made the request to the counter control module 906, and the table control module 908.

Similarly, the response detection module 904 is configured to detect when a response has been issued to a master 102A, 102B or 102C by the slave 106. In some cases, the response detection module 904 is configured to detect that a response has been issued when the Valid_In 220 and Enable_Out 218 signals are high. When the response detection module 904 detects a response has been issued it sends an indication of the detection along with information identifying the master to the counter control module 906, the table control module 908 and the error detection module 910.

The counter control module 906 is configured to write to and read from the counters 704A, 704B and 704C. In particular, the counter control module 906 is configured to: (i) read from and write to the counters 704A, 704B and 704C to ensure each counter 704A, 704B and 704C has a current count of the number of in-flight transactions for each master/requestor; and (ii) read the current value of the counters 704A, 704B and 704C and provide them to the table control module 908 so that the table 706 can be updated accordingly.

In some cases, upon receiving an indication from the request detection module 902 that a transaction request has been issued from a particular master/requestor, the counter control module 906 is configured to request the current value of the counter 704A, 704B or 704C corresponding to the particular master and provide this to the table control module 908. In the next cycle, the counter control module 906 then increments the counter 704A, 704B or 704C for that particular master to indicate there is one more transaction in-flight for the particular master.

Upon receiving an indication from the response detection module 904 that a response has been issued to particular master/requestor, the counter control module 906 requests the current value of the counter 704A, 704B or 704C corresponding to the particular master. In the next cycle, the counter control module decrements the counter 704A, 704B or 704C to indicate there is one less transaction in-flight for the particular master/requester.

The table control module 908 is configured to read from and write to the table 706. In particular, the table control module 908 is configured to: (i) read from and write to the table 706 so that the table contains 706 information indicating which particular transactions are in-flight and the relative order of the in-flight transactions (e.g. the order in which they were issued) for each master/requestor; and (ii) read from the table 706 and provide the current information to the error detection module so that the error detection module 910 can determine if an error occurred (e.g. a response came back out of order).

Upon receiving an indication from the request detection module 902 that a transaction request has been issued by a master 102A, 102B or 102C the table control module 908 is configured to update the row of the table 706 corresponding to the master that issued the request (which may be identified by the master ID information) and the column(s) corresponding to the Request_ID 206 to indicate (a) a transaction with that Request_ID 206 is in-flight for that master/requestor; and (b) the age of the transaction with respect to the other in-flight transactions for that master/requestor. The age is determined from the counter value for the master that issued the request. An example method for updating the table 706 upon detecting a transaction request has been issued is described with reference to FIGS. 10-12.

Upon receiving an indication from the response detection module 704 that a response has been received, the table control module 906 may be configured to update the row of the table 706 corresponding to the master that is to receive the response so that (a) the column(s) corresponding to the Response_ID indicate a transaction with that ID is no-longer in-flight (e.g. a response has been received) for that master; and (b) the age column(s) of the other in-flight transactions for that master indicate that each remaining in-flight transaction has moved up in the order. An example method for updating the table 706 upon detecting a transaction response has been received is described with reference to FIGS. 13-15.

The error detection module 910 is configured to detect when a response has come back out of order when it was expected to come back in order. In one example, upon receiving an indication from the response detection module 904 that a response has been issued for a master 102A, 102B or 102C, the error detection module 910 analyses the table entry received from the table control module 908 corresponding to the master and Response_ID to determine whether it indicates that the response corresponds to the oldest in-flight transaction for that master.

In some cases the verification or checking performed by the error detection module 910 is accomplished through use of an assertion. As is known to those of skill in the art an assertion is a statement about a specific property that is expected to hold for a design (e.g. is always true). In other words, an assertion is an expression that, if false, indicates an error. Within hardware description language (HDL) designs, an assertion is an executable statement that checks for specific behavior within the HDL design.

An assertion is typically written in an assertion language. Assertion languages include, but are not limited to, System-Verilog (SV), Property Specification Language (PSL), Incisive Assertion Library (IAL), Synopsys OVA (OpenVera Assertions), Symbolic Trajectory Evaluation (STE), SystemC Verification (SVC), 0-In, Specman, and OpenVera Library (OVL).

Figure 10:
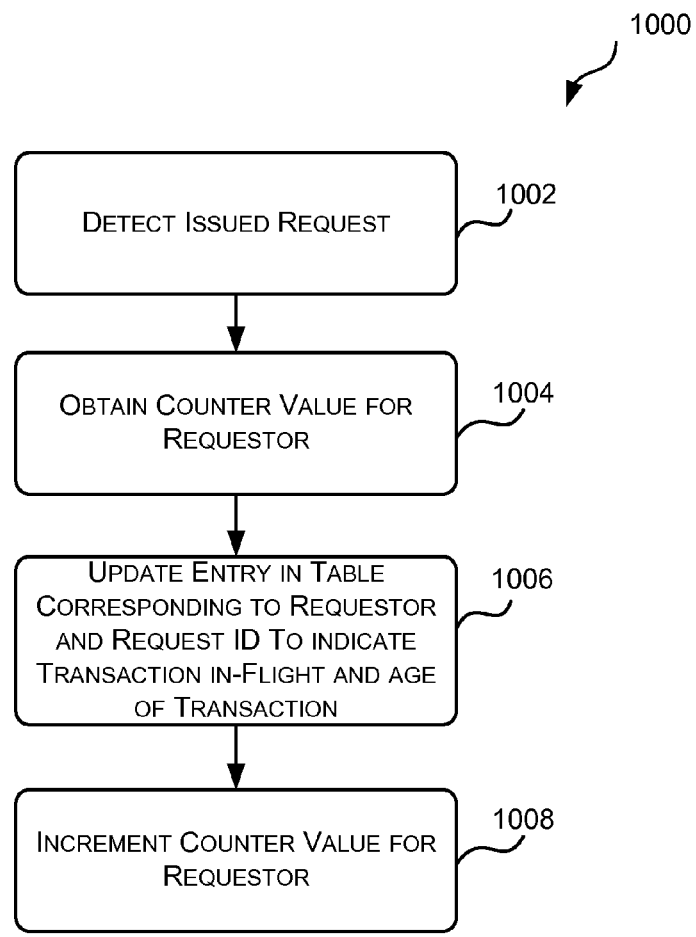
FIG. 10 is a flow chart of a method for updating the counters and table of the data structure of FIG. 7 upon detecting a transaction request has been issued.

Reference is now made to FIG. 10 which illustrates an example method 1000 that may be executed by the control logic 708 when it detects a transaction request has been issued from a master 102A, 102B or 102C. The method 1000 starts at block 1002 where the request detection module 902 detects a transaction request has been issued by a master 102A, 102B or 102C. As described above, the request detection module 902 may detect a transaction request has been issued by a master when the Valid_Out 208 and Enable_In 210 signals are high. Once it has been detected that a transaction request has been issued the method 1000 proceeds to block 1004.

At block 1004, the value of the counter 704A, 704B, 704C for the master that issued the request is obtained. For example, if Master 0 issued the transaction request then the value of the counter 704A corresponding to Master 0 is obtained. As described above the counter 704A, 704B, 704C provides an indication of the number of transactions currently in-flight for that master/requestor. In some cases, the value of a counter 704A, 704B, 704C may be read or otherwise obtained by the counter control module 906.

In cases where the table has a valid bit (as shown in (A) of FIG. 8) a counter value of zero may indicate there are no transactions in-flight and a non-zero counter value indicates the number of transactions in-flight. In some cases the number of transactions in-flight is equal to the counter value. For example, in these cases a counter value of two indicates there are two transactions currently in-flight. This is illustrated in (A) of FIG. 11 where the counter 704A for Master 0 is set to "001" (1) indicating Master 0 currently has 1 transaction in-flight; the counter 704B for Master 1 is set to "010" (2) indicating Master 1 currently has two transactions in-flight; and the counter 704C for Master 2 is set to "000" (0) indicating Master 2 currently has no transactions in-flight.

In other cases where the table does not have a valid bit (as shown in (B) of FIG. 8) a counter value of one may indicate there are no transactions in-flight and a counter value greater than one indicates the number of transactions in-flight. In some cases the number of transactions in-flight is equal to the counter value less one. For example, in these cases, a counter value of three indicates there are 3−1=2 transactions currently in-flight. This is illustrated in (A) of FIG. 12 where the counter 704A for Master 0 is set to "010" (2) indicating Master 0 currently has 1 transaction in-fight; the counter 704B for Master 1 is set to "011" (3) indicating Master 1 currently has two transactions in-flight; and the counter 704C for Master 2 is set to "001" (1) indicating Master 2 currently has no transactions in-flight.

Once the current value of the counter for the master that issued the request is obtained the method 1000 proceeds to block 1006.

At block 1006, the table is updated using the counter 704A, 704B, 704C value obtained in block 1004 to indicate that the master that issued the transaction has a transaction with the Request_ID specified in the request in-flight and the new in-flight transaction is the newest in-flight transaction for the master.

Where the table 706 comprises a valid bit/column (as shown in (A) of FIG. 8) updating the table may comprise updating the row corresponding to the master that issued the transaction so that: (i) the valid column corresponding the Request_ID is set to indicate that the transaction is in-flight (e.g. valid bit is set to one); and (ii) the age value corresponding to the Request_ID is set to the current value of the counter 704A, 704B, 704C obtained in block 1004 to indicate the current order of the transaction with respect to the other in-flight transactions. In some cases, the lower the age value, the older the in-flight transaction (e.g. the more time has passed since the transaction request was issued) and the higher the age value, the newer the in-flight transaction (e.g. the more recently the transaction request was issued).

Figure 11:
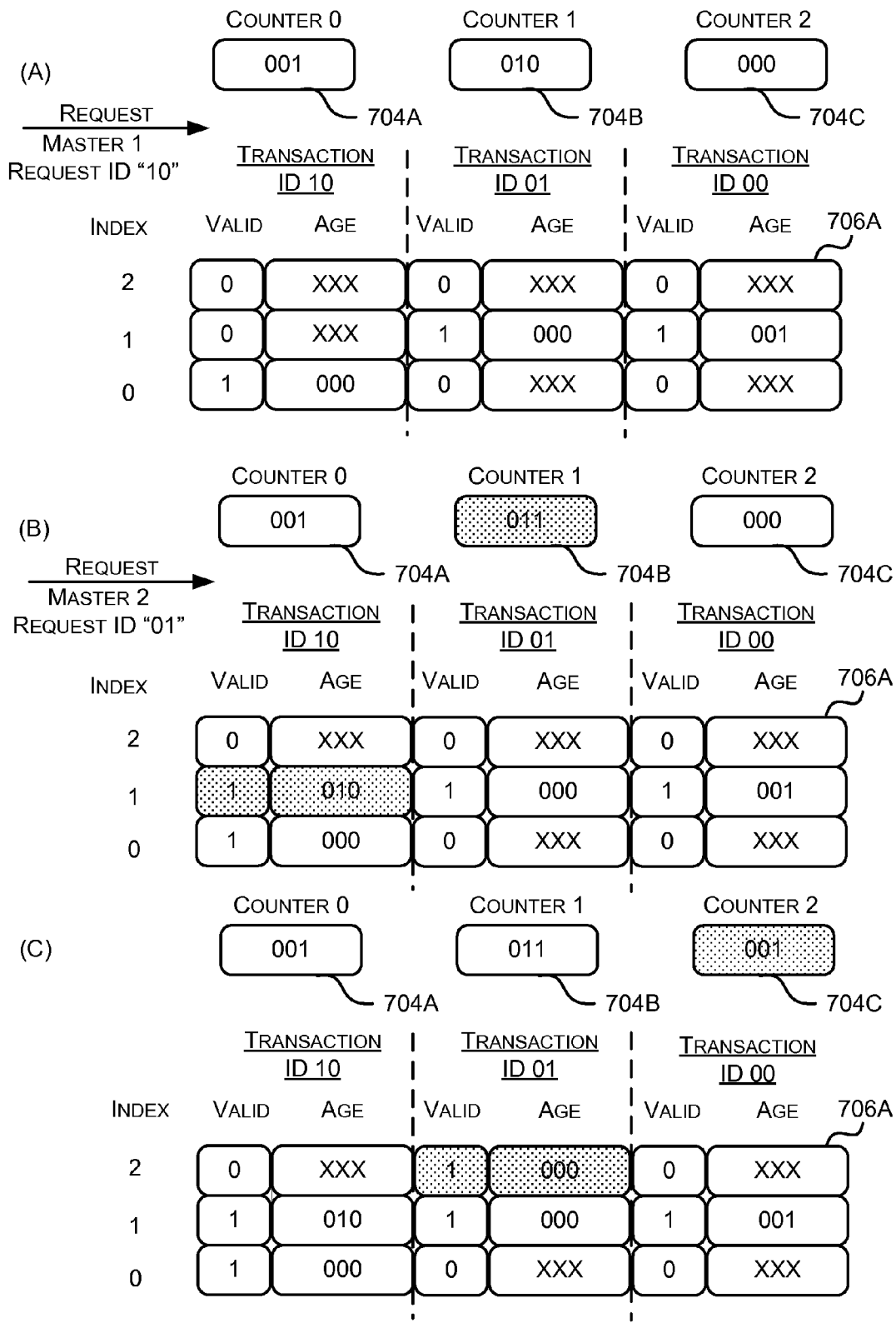
FIG. 11 is a series of block diagrams illustrating the status of a first exemplary set of counters and table of the data structure of FIG. 7 after a transaction request has been issued.

This is illustrated in FIG. 11. In particular, in (A) of FIG. 11 a new transaction request is issued from Master 1 with a Request_ID of "10" (2). This causes, as shown in (B) of FIG. 11, row 1 of the table to be updated so that the valid column for transaction ID "10" is set to "1" and the age column for transaction ID "10" is set to the current counter 704B value for Master 1 ("010" in this case). As described above, the current counter 704B value of "010" indicates that there are two other transactions in-flight for Master 1.

In (B) of FIG. 11 a new transaction request is issued from Master 2 with a Request_ID of "01". This causes, as shown in (C) of FIG. 11, row 2 of the table to be updated so that the valid bit for transaction ID "01" is set to "1" and the age column for transaction ID "01" is set to the current counter 704C value for Master 2 ("000" in this case). As described above, the current counter 704C value of "000" indicates that there are currently no transactions in-flight for Master 2.

Where the table 706 does not comprise a valid bit/column (as shown in (B) of FIG. 8) updating the table 706 may comprise updating the row corresponding to the master that issued the transaction so that the age value corresponding to the Request_ID is set to the current value of the counter 704A, 704B, 704C for the master. This indicates a transaction with that transaction ID is in-flight and the order of the transaction with respect to the other in-flight transactions for that master.

Figure 12:
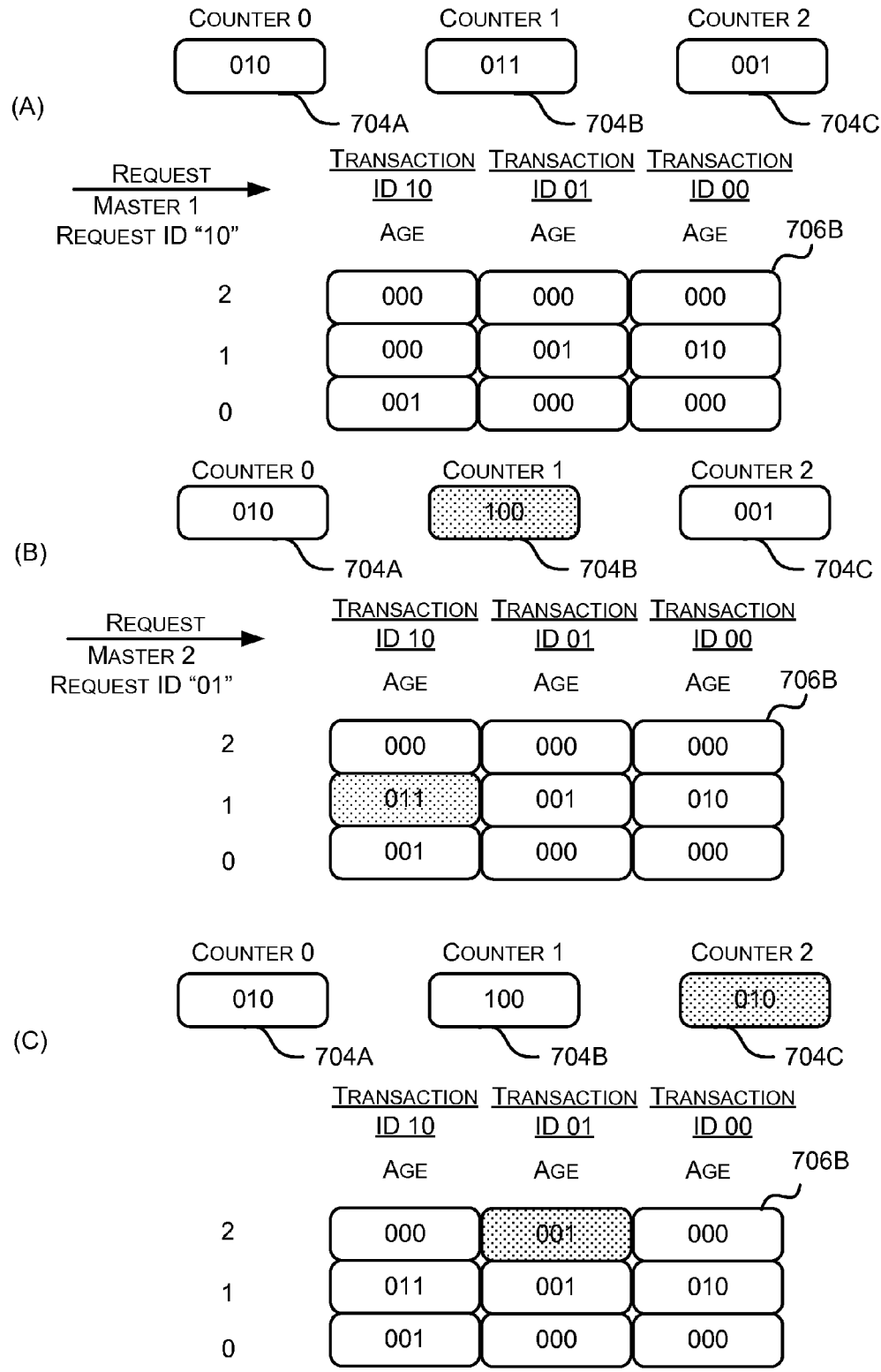
FIG. 12 is a series of block diagrams illustrating the status of a second exemplary set of counters and table of the data structure of FIG. 7 after a transaction request has been issued.

This is illustrated in FIG. 12. In particular, in (A) of FIG. 12 a new transaction request is issued from Master 1 with a Request_ID of "10" (2). This causes, as shown in (B) of FIG. 12, row 1 of the table 706 to be updated so the age value for transaction ID "10" is set to the current counter 704B value for the master ("011" in this case). In (B) of FIG. 12 a new transaction request is issued from Master 2 with a Request_ID of "01" (1). This causes, as shown in (C) of FIG. 12 row 2 of the table 706 to be updated so the age value for transaction ID "01" is set to the current counter 704B value for the master ("001" in this case).

Once the table has been updated the method 1000 proceeds to block 1008.

At block 1008, the counter 704A, 704B, 704C corresponding to the master that issued the request is incremented (e.g. by the counter control module 706) to reflect the fact that the master now has one more transaction in-flight.

This is illustrated in FIGS. 11 (valid bit) and 12 (no valid bit).

In particular, in (A) of FIG. 11 Master 1 issues a new transaction request. This causes, as shown in (B) of FIG. 11, the counter 704B corresponding to Master 1 to be incremented from "010" in (A) of FIGS. 11 to "011" in (B) of FIG. 11 to indicate that Master 1 currently has three transactions in-flight. In (B) of FIG. 11 Master 2 issues a new transaction request. This causes, as shown in (C) of FIG. 11, the counter 704C corresponding to Master 2 to be incremented from "000" in (B) of FIG. 11 to "001" in (C) of FIG. 11 to indicate that Master 2 now has one transaction in-flight.

Now turning to FIG. 12, in (A) of FIG. 12 Master 1 issues a new transaction request. This causes, as shown in (B) of FIG. 12, the counter 704B corresponding to Master 1 to be incremented from "011" in (A) of FIG. 12 to "100" in (B) of FIG. 12 to indicate that Master 1 currently has three transactions in-flight. In (B) of FIG. 12 Master 2 issues a new transaction request. This causes, as shown in (C) of FIG. 12, the counter 704C corresponding to Master 2 to be incremented from "001" in (B) of FIG. 12 to "010" in (C) of FIG. 12 to indicate that Master 2 now has one transaction in-flight.

Figure 13:
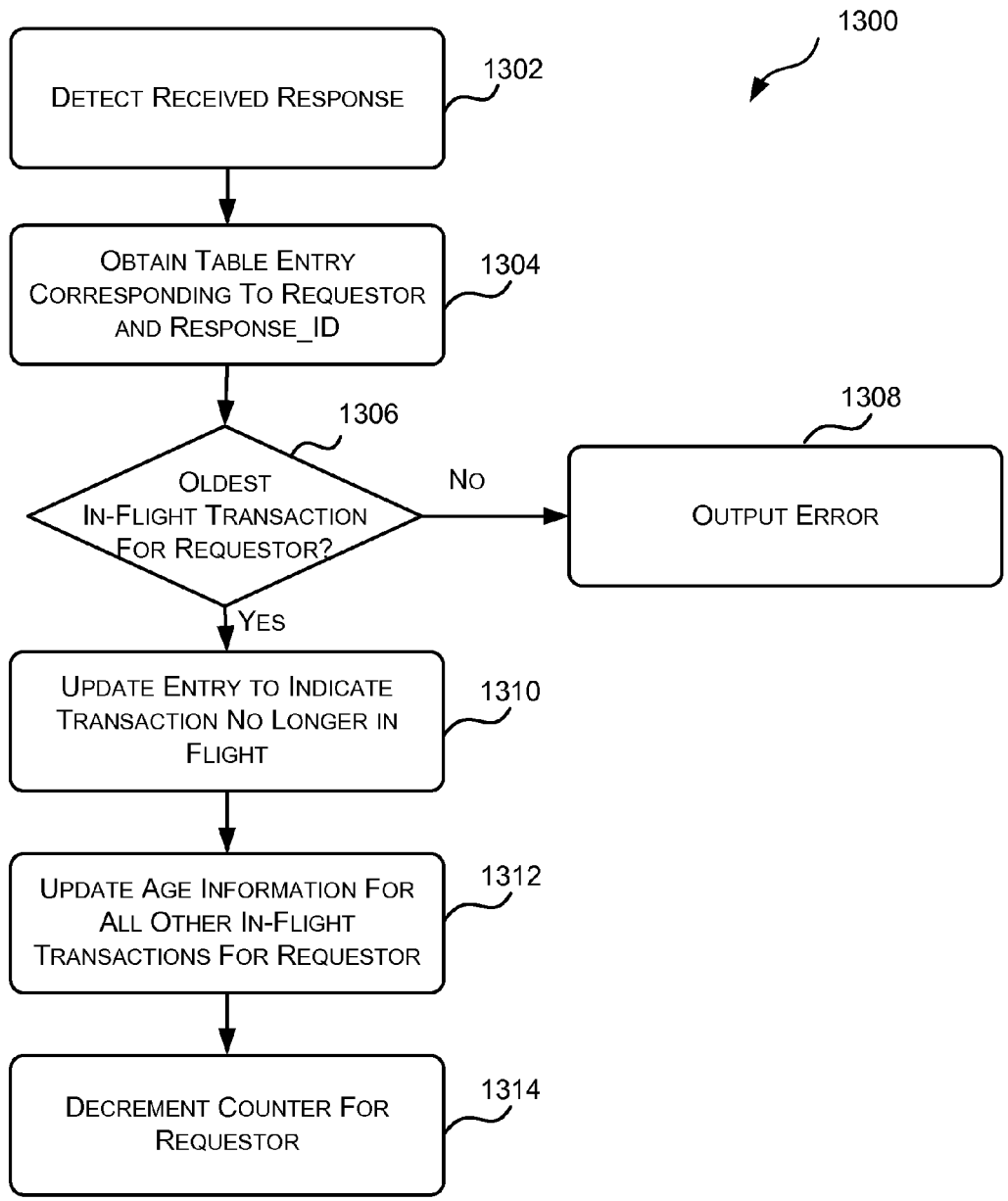
FIG. 13 is a flow chart of a method for determining whether a transaction response has been issued in the correct order using the data structure of FIG. 7.

Reference is now made to FIG. 13 which illustrates an example method 1300 that may be executed by the control logic 708 when it detects a response has been generated by the slave 106. The method 1300 starts at block 1302 where the response detection module 904 detects a transaction response has been generated by the slave 106. As described above, the response detection module 904 may detect a response has been generated by the slave 106 when the Valid_In 220 and Enable_Out 218 signals are high. The detected response will be associated with a master and will comprise a transaction ID (e.g. Response_ID). Once it has been detected that a response has been generated by the slave 106 the method 1300 proceeds to block 1304.

Figure 14:
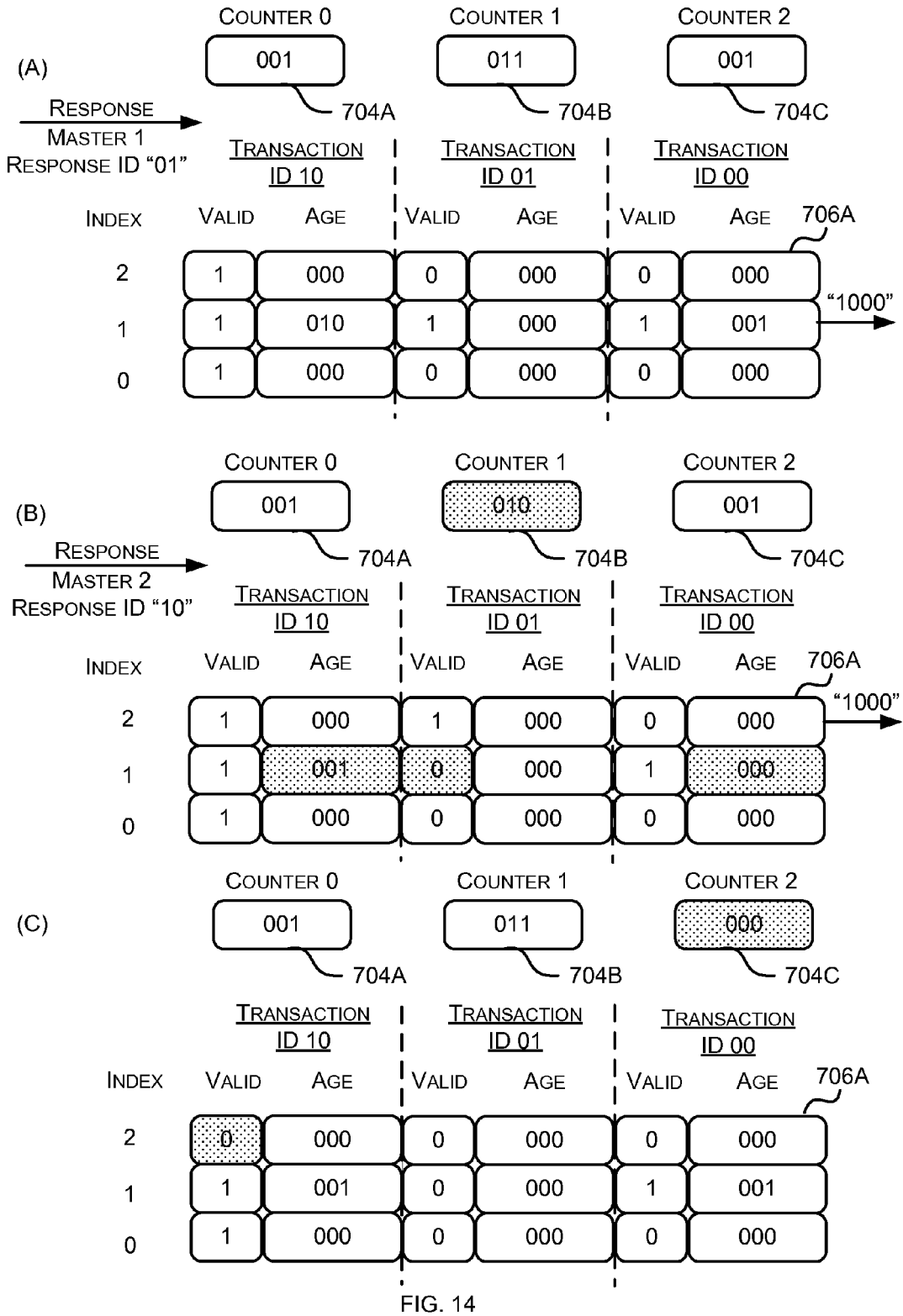
FIG. 14 is a series of block diagrams illustrating the status of a first exemplary set of counters and table of the data structure of FIG. 7 after a transaction response has been issued.
Figure 15:
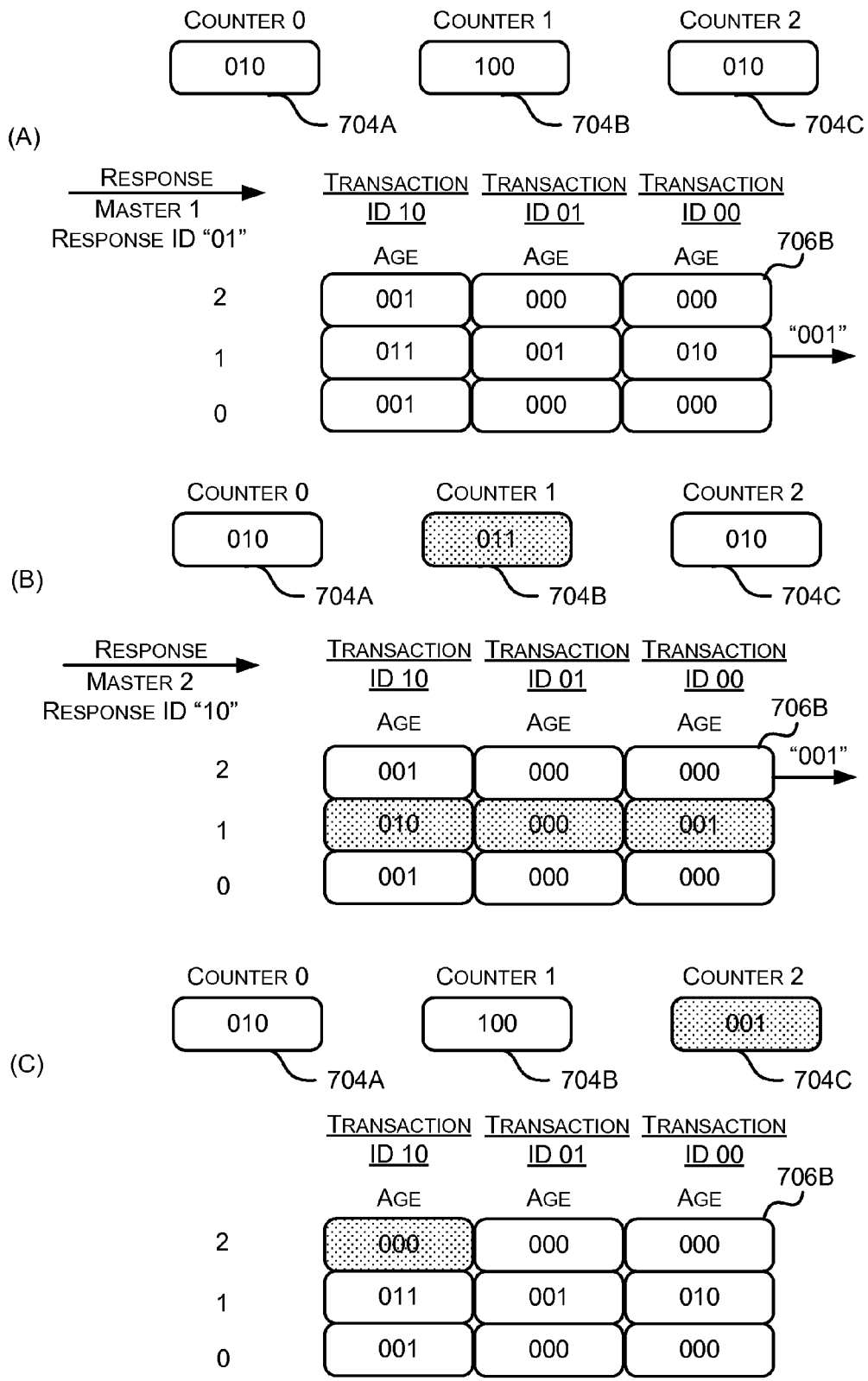
FIG. 15 is a series of block diagrams illustrating the status of a second exemplary set of counters and table of the data structure of FIG. 7 after a transaction response has been issued.

At block 1304 the column(s) of the table 706 corresponding to the master and the transaction ID (e.g. Response_ID 216) associated with the response is/are retrieved (e.g. by the table control module 908). The selected column(s) provide information on the status of the transaction with the specified transaction ID (e.g. Response_ID 216) for that master. In particular, the selected columns indicate whether a transaction with that ID is in-flight and its age with respect to the other in-flight transactions for that master. This is illustrated in FIGS. 14 and 15. In particular, FIG. 14 illustrates an example for a table 706A with a valid bit and FIG. 15 illustrates an example for a table 706B without a valid bit.

Where the table comprises a valid bit then both the valid bit and the age value corresponding to the master and Response_ID are retrieved. This is illustrated in FIG. 14. In particular, in (A) of FIG. 14 a response is generated for Master 1 with a Response_ID of "01" (1). This results in the valid bit and the age value in row 1 (i.e. Master 1) corresponding to transaction ID "01" being output. In this case we see the valid bit "1" and age value "000" being output. Then in (B) of FIG. 14 a response is generated for Master 2 with a Response_ID of "10" (2). This results in the valid bit and the age value in row 2 (i.e. Master 2) corresponding to transaction ID "10" being output. In this case we see the valid bit "1" and age value "000" being output.

Where the table does not comprise a valid bit then only the age value corresponding to the master and Response_ID is retrieved. This is illustrated in FIG. 15. In particular, in (A) of FIG. 15 a response is generated for Master 1 with a Response_ID of "01" (1). This results in the age value in row 1 (i.e. Master 1) corresponding to transaction ID "01" being output. In this case we see the age value "001" being output. Then in (B) of FIG. 15 a response is generated for Master 2 with a Response_ID of "10" (2). This results in the age value in row 2 (i.e. Master 2) corresponding to transaction ID "10" being output. In this case we see the age value "001" being output.

Once the corresponding columns of the table 706 are retrieved, the method 1300 proceeds to block 1306.

At block 1306 it is determined whether the column(s) of the table 706 corresponding to the master and transaction ID (e.g. Response_ID) indicate that the response was issued in order. In some cases it is determined that the response was issued in order if the relevant column(s) of the table indicate that a transaction with the Response_ID was in-flight for that master and such a transaction was the oldest in-flight transaction for the master. This may be determined, for example, by the error detection module 910.

Where the table comprises a valid bit, the valid bit (e.g. the most significant bit) may indicate that a transaction with the Response_ID was in-flight if it is set; and the age value may indicate that the transaction was the oldest in-flight transaction if it is set to the lowest possible in-flight value. In some cases the lowest possible in-flight may be zero in other cases the lowest age value may be another value (e.g. one). This is illustrated in FIG. 14. In particular, in (A) of FIG. 14 a response for Master 1 with a Response_ID of "01" is generated by the slave 106. As described above, this causes the valid bit and age value in row 1 (Master 1) corresponding to transaction ID "01" to be retrieved. In this case the output is a valid bit of 1 and an age value of "000". Since the valid bit is set and the age value is zero then the response has come back in order.

Where the table does not comprise a valid bit, the age value may indicate that a transaction with the Response_ID was in-flight if it is set to a predetermined value (e.g. zero) and it may indicate it is the oldest in-flight transaction if it is set to the lowest possible in-flight value (e.g. one). This is illustrated in FIG. 15. In particular, in (A) of FIG. 15 a response for Master 1 with a Response_ID of "01" is generated by the slave in an example where the predetermined value is zero and the lowest possible in-flight value is one. As described above, this causes the age value in row 1 (Master 1) corresponding to transaction ID "01" to be retrieved. In this case the output is an age value of "001". Since this age value is not set to the predetermined value (e.g. it is not set to zero) and it is set to lowest in-flight value (e.g. one) then the response has come back in order.

If the response was issued in the correct order then the method 1300 proceeds to block 1310. Otherwise the method 1300 proceeds to block 1308 where an error is output.

At block 1310, the table 706 is updated to indicate the transaction for which a response was generated is no-longer in-flight.

Where the table comprises a valid bit, updating the table to indicate the transaction is no longer in-flight comprises clearing the valid bit in the row for the master corresponding to transaction ID of the response (e.g. Response_ID). This is illustrated in FIG. 14. In particular, in (A) of FIG. 14 a response for Master 1 with a Response_ID of "01" is generated by the slave 106. This causes, as shown in (B) of FIG. 14, the valid bit in row 1 (e.g. Master 1) corresponding to transaction ID "01" is cleared. Similarly, in (B) of FIG. 14 a response for Master 2 with a response ID of "10" (2) is generated by the slave 106. This causes, as shown in (C) of FIG. 14, the valid bit in row 2 (e.g. Master 2) corresponding to transaction ID "10" to be cleared.

Where the table does not comprise a valid bit, updating the table to indicate the transaction is no longer in-flight comprises clearing the age value in the row for the master corresponding to the transaction ID of the response (e.g. Response_ID). This is illustrated in FIG. 15. In particular, in (A) of FIG. 15 a response for Master 1 with a Response_ID "01" is generated by the slave 106. This causes, as shown in (B) of FIG. 15, the age value in row 1 (e.g. Master 1) corresponding to transaction ID "01" to be cleared (e.g. set to zero). Similarly, in (B) of FIG. 15, a response for Master 2 with a response ID of "10" is generated by the slave 106. This causes, as shown in (C) of FIG. 15, the age value in row 2 (e.g. Master 2) corresponding to transaction ID "10" to be cleared.

Once the table has been updated to indicate the transaction is no longer in-flight the method 1300 proceeds to block 1312.

At block 1312, the table is updated to reflect the fact the remaining in-flight transactions for the master have now moved up in the order of in-flight transaction for that master. For example, an in-flight transaction that was the second oldest in-flight transaction now becomes the oldest in-flight transaction. In some cases updating the table comprises decrementing the age value for each remaining in-flight transaction.

A first example with a table comprising a valid bit is shown in FIG. 14. In particular, in (A) of FIG. 14 a response is generated for Master 1 with a Response_ID of "01". According to the table there are still two remaining in-flight transactions for this master. In particular, there are two transaction IDs (ID "00" and "10" that have the valid bit set). To reflect the fact that each of these transactions has now moved up the in-flight transaction order the corresponding age values are decremented. Specifically, the age value for transaction ID "10" is decremented from "010" in (A) of FIG. 14 to "001" in (B) of FIG. 14 and the age value for transaction ID "00" is decremented from "001" in (A) to "000" in (B).

A second example with a table without a valid bit is shown in FIG. 15. In particular, in (A) of FIG. 15 a response is generated for Master 1 with a Response_ID of "01". According to the table there are still two remaining in-flight transactions for this master. In particular, there are two transaction IDs (ID "10" and ID "00" that have a non-zero age value). To reflect that fact that each of these transactions have now moved up in the in-flight transaction order the corresponding age values are decremented. Specifically, the age value for transaction ID "10" is decremented from "011" in (A) of FIG. 15 to "010" in (B) of FIG. 15 and the age value for transaction ID "00" is decremented from "010" in (A) of FIG. 15 to "001" in (B) of FIG. 15.

Once the age values for the remaining in-flight transactions have been updated, the method 1300 proceeds to block 1314.

At block 1314 the counter 704A, 704B or 704C corresponding to the master is decremented to indicate that there is now one less transaction in-flight (since a response has been received) for that master.

A first example with a table comprising a valid bit is shown in FIG. 14. In particular, in (A) of FIG. 14 a response is generated for Master 1 with a Response_ID of "01". This causes the counter 704B corresponding to Master 1 to be decremented from "011" in (A) of FIG. 14 to "010" in (B) of FIG. 14.

A second example with a table without a valid bit is shown in FIG. 15. In particular, in (A) of FIG. 15 a response is generated from Master 1 with a Response_ID of "01". This cause the counter 704B corresponding to Master 1 to be decremented from "100" in (A) of FIG. 15 to "011" in (B) of FIG. 15.

Reference is now made to FIG. 16 which illustrates an example timing diagram of the signals and elements (counters 704A, 704B, 704C and table 706) of the data structure 702 of FIG. 7 where there are two masters, Master 0 and Master 1, and the table comprises a valid bit as described with reference to (A) of FIG. 8. The timing diagram shows the status of the signals and elements for seven clock cycles numbered 1 to 7. The Issue_In_X signal is used to indicate that a response has been generated for Master X; the Issue_Out_X signal is used to indicate that a transaction request has been issued by Master X; and Table[N] is used to indicate the $N^{th}$ row of the Table where row N corresponds to Master N.

In the first clock cycle the counters have values of zero, and the valid bits have a value of zero as shown in Table 1 and a transaction request is issued from Master 0 with ID 1.

TABLE 1

| COUNTER_0: 0 | | | COUNTER_1: 0 | |
|---|---|---|---|---|
| | | Transaction ID 1 | | Transaction ID 0 |
| Table Index | Valid | Age | Valid | Age |
| 0 | 0 | XXX | 0 | XXX |
| 1 | 0 | XXX | 0 | XXX |

In the second clock cycle, the counter_0 (the counter for Master 0) is incremented to 1 to indicate that there is now one transaction in-flight (ID 1) for Master 0; the valid bit corresponding to transaction ID 1 in row 0 is set and the age value corresponding to transaction ID 1 in row 0 is set to 0 as shown in Table 2 to indicate that a transaction with ID 1 is in-flight and is the oldest in-flight transaction for Master 0. Also in the second clock cycle a transaction request is issued from Master 0 with ID 0.

TABLE 2

| COUNTER_0: 1 | | | COUNTER_1: 0 | |
|---|---|---|---|---|
| | | Transaction ID 1 | | Transaction ID 0 |
| Table Index | Valid | Age | Valid | Age |
| 0 | 1 | 000 | 0 | XXX |
| 1 | 0 | XXX | 0 | XXX |

In the third clock cycle, counter_0 (the counter for Master 0) is incremented to 2 to indicate that there are now two transactions in-flight (ID 1, ID 0) for Master 0; the valid bit corresponding to transaction ID 0 in row 0 is set and the age value corresponding transaction ID 0 is set to 1 to indicate that a transaction with ID 0 is in-flight and is the second oldest in-flight transaction as shown in Table 3. Also in the third clock cycle a transaction request is issued from Master 1 with ID 0.

TABLE 3

| COUNTER_0: 2 | | | COUNTER_1: 0 | |
|---|---|---|---|---|
| | | Transaction ID 1 | | Transaction ID 0 |
| Table Index | Valid | Age | Valid | Age |
| 0 | 1 | 000 | 1 | 001 |
| 1 | 0 | XXX | 0 | XXX |

In the fourth clock cycle, counter_1 (the counter for Master 1) is incremented to 1 to indicate that Master 1 has one transaction (ID 0) in-flight; the valid bit corresponding to transaction ID 0 in row 1 is set and the age value corresponding to transaction ID 0 is set to 0 as shown in Table 4 to indicate that a transaction with ID 0 is in-flight and is the oldest in-flight transaction for Master 1. Also, in the fourth clock cycle a transaction request is issued from Master 1 with ID 1.

TABLE 4

| COUNTER_0: 2 | | | COUNTER_1: 1 | |
|---|---|---|---|---|
| | | Transaction ID 1 | | Transaction ID 0 |
| Table Index | Valid | Age | Valid | Age |
| 0 | 1 | 000 | 1 | 001 |
| 1 | 0 | XXX | 1 | 000 |

In the fifth clock cycle, counter_1 (the counter for Master 1) is incremented to 2 to indicate that there are now two transactions in-flight (ID 0; ID 1) for Master 1; the valid bit corresponding to transaction ID 1 in row 1 is set and the age value corresponding to transaction ID 1 in row 1 is set to 1 to indicate that the transaction with ID 1 is in-flight and is the second oldest transaction in-flight for Master 1 as shown in Table 5. Also in the fifth clock cycle a transaction response is generated for Master 1 with ID 0.

TABLE 5

| COUNTER_0: 2 | | COUNTER_1: 2 | |
|---|---|---|---|
| | Transaction ID 1 | | Transaction ID 0 |
| Table Index | Valid | Age | Valid | Age |
| 0 | 1 | 000 | 1 | 001 |
| 1 | 1 | 001 | 1 | 000 |

In the sixth clock cycle, the counter_1 (the counter for Master 1) is decremented to 1 to indicate that now there is only one transaction in-flight (ID 1) for Master 1; the valid bit corresponding to transaction ID 0 in row 1 is reset to indicate the transaction with ID 0 is no longer in-flight (a response has been received) for Master 1; the age value corresponding to transaction ID 1 in row 1 is decremented to 0 to indicate that the transaction with ID 1 is now is the oldest transaction in-flight for Master 1 as shown in Table 6. Also in the sixth clock cycle a transaction response is generated for Master 0 with ID 1.

TABLE 6

| COUNTER_0: 2 | | COUNTER_1: 1 | |
|---|---|---|---|
| | Transaction ID 1 | | Transaction ID 0 |
| Table Index | Valid | Age | Valid | Age |
| 0 | 1 | 001 | 1 | 000 |
| 1 | 1 | 000 | 0 | 000 |

In the seventh clock cycle, the counter_0 (the counter for Master 0) is decremented to 1 to indicate that now there is only one transaction in-flight (ID 0) for Master 0; the valid bit corresponding to transaction ID 1 in row 0 is reset to indicate the transaction with ID 1 is no longer in-flight (a response has been received) for Master 0; the age value corresponding to transaction ID 0 in row 0 is decremented to 0 to indicate that the transaction with ID 0 is the oldest transaction in-flight for Master 0 as shown in Table 7.

TABLE 7

| COUNTER_0: 1 | | COUNTER_1: 1 | |
|---|---|---|---|
| | Transaction ID 1 | | Transaction ID 0 |
| Table Index | Valid | Age | Valid | Age |
| 0 | 0 | 000 | 1 | 000 |
| 1 | 1 | 000 | 0 | 000 |

Although the data structure and methods of FIGS. 7 to 16 have been described with reference to a multi-transactional system with a single slave that receives transaction requests from multiple masters, the principles and methods described herein can also be applied to multi-transactional systems with multiple slaves that each receives transaction requests from multiple masters.

In some cases with multiple slaves, each master does not expect to receive all transaction responses in the same order in which the corresponding transaction responses were issued to the slaves, the master only expects to receive the transactions responses from each slave back in the same order in which the corresponding transaction requests were issued to that slave. For example, in these cases if a master issues a transaction request with ID 1 to slave 1, a transaction request with ID 2 to slave 2, and then a transaction request with ID 3 to slave 2, the transaction response for ID 1 does not have to be issued to the master before the transaction responses for IDs 2 and 3 since they relate to different slaves, however the transaction response for ID 2 should be issued before the transaction response for ID 3 since these transactions relate to the same slave.

In other cases with multiple slaves, each master expects to receive all transaction responses in the same order in which the corresponding transaction requests were issued to the slaves. For example, in these cases if a master issues a transaction request with ID 1 to slave 1, a transaction request with ID 2 to slave 2, and then a transaction request with ID 3 to slave 2, the master expects to receive the transaction response for ID 1, then ID 2 and then ID 3 irrespective of the fact they were issued to different slaves.

In these cases the data structure 702 may be modified so that the table 706 has a set of columns (e.g. columns 808-818 or columns 826-830) for each slave. Each row of the table then comprises age and/or valid information for in-flight transactions issued from a particular master to each of the slaves.

Similarly, although the data structure and methods of FIGS. 7 to 16 have been described in reference to monitoring and/or enforcing local ordering (i.e. ordering of transactions for each master), the principles and methods described herein can also be used for monitoring and/or enforcing global ordering. In these cases the data structure 702 described herein may be modified so that (i) there is a single counter 704A, 704B or 704C for keeping track of all of the in-flight transactions for the slave 106; and (ii) the table 706 comprises a single row that has a set of columns (e.g. columns 808-818 or columns 826-830) for each master 102A, 102B and 102C. The single row of the table then comprises age and/or valid information for in-flight transactions issued from each master 102A, 102B and 102C to the slave 106.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A hardware data structure configured to track a plurality of ordered transactions in a multi-transactional hardware design comprising a slave and a plurality of masters, the slave configured to receive transaction requests from more than one of the plurality of masters, the hardware data structure comprising:
   one or more counters configured to track a number of in-flight transactions in the hardware design;
   a table configured to track an age of each of the in-flight transactions for the plurality of masters using the one or more counters; and
   control logic configured to verify that a transaction response issued by the slave for an in-flight transaction for a particular master has been issued in a predetermined order based on the tracked age of the in-flight transaction for that master in the table.

2. The hardware data structure of claim 1, wherein the table comprises transaction information for each master of the plurality of masters, the transaction information comprising in-flight information for each of a plurality of transactions associated with that master.

3. The hardware data structure of claim 2, wherein the in-flight information indicates whether the transaction is in-flight and if in-flight, the age of the transaction.

4. The hardware data structure of claim 3, wherein the in-flight information comprises a valid bit that indicates whether the transaction is in-flight and an age value that indicates the age of the transaction; or,
   wherein the in-flight information comprises an age value that indicates whether the transaction is in-flight and the age of the transaction.

5. The hardware data structure of claim 3, wherein the control logic comprises a request detection module configured to detect when a new transaction is in-flight for a specific master by monitoring one or more control signals of an input interface of the slave.

6. The hardware data structure of claim 5, wherein the control logic further comprises a counter control module configured, in response to the request detection module detecting that a new transaction is in-flight for the specific master, to increment one of the one or more counters.

7. The hardware data structure of claim 6, wherein the one or more counters comprises a counter for each master of the plurality of masters, each counter configured to track a number of in-flight transactions for the associated master; and the counter control module is configured, in response to the request detection module detecting that a new transaction is in-flight for the specific master, to increment the counter for the specific master.

8. The hardware data structure of claim 5, wherein the control logic further comprises a table control module configured, in response to the request detection module detecting that a new transaction is in-flight for the specific master, to update the transaction information for the specific master so that the in-flight information for the new transaction comprises a numerical value equal to one counter of the one or more counters, the counter indicating the age of the new transaction with respect to the other in-flight transactions.

9. The hardware data structure of claim 8, wherein the one or more counters comprises a counter for each master of the plurality of masters, each counter configured to track a number of in-flight transactions for the associated master; and the table control module is configured, in response to the request detection module detecting that a new transaction is in-flight for the specific master, to update the transaction information for the specific master so that the in-flight information for the new transaction comprises a numerical value equal to the counter for the specific master.

10. The hardware data structure of claim 8, wherein the table control module is further configured, in response to the request detection module detecting that a new transaction is in-flight for the specific master, to update the transaction information for the specific master so that the in-flight information for the new transaction indicates the new transaction is in-flight.

11. The hardware data structure of claim 3, wherein the control logic comprises a response detection module configured to detect when a transaction response has been issued for an in-flight transaction for a specific master by monitoring one or more control signals of an output interface of the slave.

12. The hardware data structure of claim 11, wherein the control logic further comprises a counter control module configured, in response to the response detection module detecting that a transaction response has been issued for an in-flight transaction for a specific master, to decrement one counter of the one or more counters.

13. The hardware data structure of claim 12, wherein the one or more counters comprises a counter for each master of the plurality of masters, each counter configured to track a number of in-flight transactions for the associated master; and the counter control module is configured, in response to the response detection module detecting that a transaction response has been issued for an in-flight transaction for a specific master, to decrement the counter for the specific master.

14. The hardware data structure of claim 11, wherein the control logic further comprises a table control module configured, in response to the response detection module detecting that a transaction response has been issued for an in-flight transaction for a specific master, to update the transaction information for the specific master so that the in-flight information for the transaction response indicates the transaction is not in-flight.

15. The hardware data structure of claim 14, wherein the table control module is further configured, in response to the response detection module detecting that a transaction response has been issued for an in-flight transaction for a specific master, to update the transaction information for the specific master so that the in-flight information for each in-flight transaction reflects there is one-less transaction in-flight.

16. The hardware data structure of claim 11, wherein the control logic further comprises an error detection module configured, in response to the response detection module detecting that a transaction response has been issued for an in-flight transaction for a specific master, to verify that the transaction response has been issued in a predetermined order by verifying that the in-flight transaction is the oldest in-flight transaction for the specific master based on the transaction information for the specific master.

17. The hardware data structure of claim 11, wherein the control logic further comprises an error detection module configured, in response to the response detection module detecting that a transaction response has been issued for an in-flight transaction for a specific master, to verify that the transaction response has been issued in a predetermined order using one or more assertions written in an assertion-based language.

18. The hardware data structure of claim 2, wherein each transaction comprises a transaction ID and the in-flight information for a particular transaction is identified by the transaction ID.

19. A method of tracking a plurality of transactions in a multi-transactional hardware design comprising a slave and a plurality of masters, the slave configured to receive transaction requests from more than one of the plurality of masters, the method comprising:
  tracking a number of in-flight transactions in the hardware design using one or more counters;
  tracking an age of each of the in-flight transactions for the plurality of masters in a table using the one or more counters; and
  verifying that a transaction response issued by the slave for an in-flight transaction for a particular master has been issued in a predetermined order based on the tracked age of the in-flight transaction for that master in the table.

20. A non-transitory computer readable storage medium having stored thereon computer executable instructions that when executed cause at least one processor to:
  track a number of in-flight transactions in a multi-transactional hardware design using one or more counters, the multi-transactional hardware design comprising a slave and a plurality of masters;
  track an age of each of the in-flight transactions for the plurality of masters in a table using the one or more counters; and
  verify that a transaction response issued by the slave for an in-flight transaction for a particular master has been issued in a predetermined order based on the tracked age of the in-flight transaction for that master in the table.

* * * * *